United States Patent [19]
Laperrière

[11] Patent Number: 5,912,675
[45] Date of Patent: Jun. 15, 1999

[54] SYSTEM AND METHOD USING BOUNDING VOLUMES FOR ASSIGNING VERTICES OF ENVELOPES TO SKELETON ELEMENTS IN AN ANIMATION SYSTEM

[75] Inventor: Richard Laperrière, Montreal, Canada

[73] Assignee: Avid Technology, Inc., Tewksbury, Mass.

[21] Appl. No.: 08/769,566

[22] Filed: Dec. 19, 1996

[51] Int. Cl.[6] .................................................. G06F 15/00
[52] U.S. Cl. ............................................................ 345/473
[58] Field of Search .................................... 345/473, 474, 345/475, 441, 433, 435

[56] References Cited

U.S. PATENT DOCUMENTS

| | | | |
|---|---|---|---|
| 5,442,734 | 8/1995 | Murakami et al. ...................... | 395/127 |
| 5,714,977 | 2/1998 | McNeil ................................... | 345/157 |
| 5,754,189 | 5/1998 | Doi et al. ................................ | 345/473 |

*Primary Examiner*—Phu K. Nguyen

[57] ABSTRACT

A system and method for assigning the vertices of an envelope to one or more elements of a skeleton in an animation model. Bounding volumes are defined for skeleton elements and define effective volumes which are positioned relative to the skeleton elements to encompass one or more vertices of envelopes. The bounding volume geometry may be defined as desired and a desired assignment operation type is selected for the bounding volume. When automated assignment is performed, assignment of the vertices within the bounding volumes is performed in accordance with the selected assignment operation for each bounding volume and with a selected maximum number of elements to which each vertex may be assigned. Bounding volumes may be overlapped to provide versatile automated assignment and the bounding volumes and corresponding assignment operations are stored with the skeleton and therefore are independent of the envelopes employed. Thus, the bounding volumes and assignment operations can be used both for the assignment of pre-production quality, low resolution, envelopes and for the subsequent assignment of production quality, high resolution, envelopes, as desired.

32 Claims, 19 Drawing Sheets

SYSTEM AND METHOD USING BOUNDING VOLUMES FOR ASSIGNING VERTICES OF ENVELOPES TO SKELETON ELEMENTS IN AN ANIMATION SYSTEM

FIELD OF THE INVENTION

The present invention relates to an improved system and method for relating an envelope to a skeleton element in a model used in an animation system. More particularly, the present invention relates to a system and method to provide automated assignment of the vertices of envelopes to skeleton elements which includes bounding volumes that can influence this assignment.

BACKGROUND OF THE INVENTION

Many advances have been made recently in computer animation systems which are now capable of modelling complex objects. For example, cinematographic effects such as the tyrannosaurus rex dinosaur in the film Jurassic Park have been produced using sophisticated computer animation systems, such as V3.0 of the SOFTIMAGE|3D product sold by the assignee of the present invention. While such systems have demonstrated the ability to produce a high degree of realism in their animations, this level of realism requires the efforts of skilled animation artists who painstakingly craft the models which the computer animation system processes to obtain the final rendered images.

In fact, the crafting of these models involves several steps and generally requires a large time commitment for even the most skilled animation artist and thus the expense associated with producing high quality and/or photo-realistic animations can be significant. Accordingly, animation systems such as the above-mentioned SOFTIMAGE|3D system attempt to provide the animation artist with a versatile and comprehensive animation system which can produce a wide range of desired animation results and yet which is relatively easy and time efficient to use.

Two of the principle steps in creating a model for use in an animation is the creation of the skeleton and the assignment of one or more envelopes to that skeleton. In the SOFTIMAGE|3D product, a model which will be animated comprises a skeleton which defines the geometry and articulation of the model for inverse and forward kinematics purposes, amongst others.

For example, when modelling a human arm a skeleton can be defined which includes a skeleton root (used to define the positioning of the skeleton relative to other skeletons), a joint representing the shoulder and which is coincident with the skeleton root, a joint representing the elbow which is spaced from the shoulder joint by a link of predefined length, and an effector (i.e.—where the wrist/hand would attach) spaced from the elbow joint by another link of predefined length. Another of the chain components a skeleton can include are null models, which are essentially geometric place holders without size or shape and which are used for a variety of purposes, as will be discussed in more detail below.

Each joint in a skeleton can have a variety of parameters associated with it to define the range and type of movement permitted at the joint and these parameters are used for kinematic movement of the skeleton. For example, the shoulder joint moves in a ball and socket manner while the elbow joint moves in a hinge-like manner and these parameters are defined by the animation artist for each joint in the skeleton.

As mentioned above, in the prior art skeletons are used to define the geometry and articulation of the model and are not directly visible in the final rendering of the animation. Thus, once a skeleton has been created for a model, an envelope is applied to the skeleton, the envelope representing the visible features of the model which are considered when rendering the animation. Envelopes can represent skin, fur, clothing or any other feature which should be considered in rendering an animation and which is associated with a skeleton.

As part of the process of defining an envelope for a skeleton, the envelope must be related to the skeleton such that the envelope will move with the skeleton and, if desired, deform appropriately as the skeleton is moved in an animation. For example, in the above-mentioned example of a human arm, a generally cylindrical envelope can be defined to represent the skin of the arm and this envelope can be associated with the skeleton such that the envelope moves with the skeleton. More specifically, the envelope surface is defined by a plurality of vertices and these vertices are assigned to different elements in the skeleton so that, for example, the portion of the envelope representing the forearm will move with the link between the elbow and the effector as this link moves via the elbow joint.

While the simple models described above are quite versatile, it is often required for a realistic rendering of an animation that portions of the envelope be distorted or otherwise modified as the skeleton is moved. For example, it can be desired to model the bulge of a biceps on the upper arm as the forearm of a human animation model moves. In such a case, the skeleton can include another skeleton element adjacent the joint representing the elbow and appropriate vertices of the envelope in the portion of the envelope representing the upper arm are assigned to the additional skeleton element such that, when the elbow joint is rotated the additional skeleton element is also moved toward or away from the elbow joint. Thus, the vertices assigned to the additional element are moved outwardly or inwardly, distorting the envelope to mimic the bulging of a biceps.

In V3.0 of SOFTIMAGE|3D, the vertices of an envelope can be assigned to: no skeleton elements; one skeleton element; or on a weighted basis to more than one skeleton element. Thus, an envelope can include portions which do not move or deform as the skeleton moves (not assigned to an element), portions which move or deform as a joint in the skeleton moves (assigned to one element) and portions which move or deform as two or more joints in the skeleton move (assigned to more than one element).

An example of a situation wherein it is desired to have an envelope deform in response to movement of several elements is in modelling a human face. In such a model, the upper lip of the face can deform in response to movement of the jaw and/or in response to movement of the cheeks, etc.

In general, the assignment of the vertices of envelopes to skeleton elements can require a significant amount of effort on the part of the animation artist. Depending upon the model and the degree of realism required, the envelopes employed in a model can include hundreds of vertices which the artist must individually assign to skeleton elements. In V3.0 and earlier of SOFTIMAGE|3D, automatic methods have previously been provided for the initial assignment of envelope vertices to skeleton elements to reduce the effort required by the animation artist.

Specifically, one assignment method, referred to as "full weight assignment", comprises assigning each vertex in an envelope to the skeleton element to which it is physically located closest to. Another assignment method, referred to herein as "weighted assignment", allows the animation artist to pre-specify a value 'n' and each vertex of an envelope is assigned to the 'n' skeleton elements which are closest to the vertex. In the weighted assignment method, the assignments are weighted inversely proportional to the distance of the vertex from the respective skeleton elements, i.e. an assignment can be weighted 80/20% between a close skeleton element and a distal skeleton element, etc. and a full weight assignment is a 100% assignment.

While these methods have reduced the amount of effort required on the part of the animation artist, they still suffer from some problems. For example, when assigning the vertices for a portion of an envelope representing the torso in an animation model of a human, it is possible that one or more of the vertices in the torso envelope are closer to the skeleton elements in the arm of the model than they are to the skeleton elements in the torso (such as the skeleton elements representing the spine). Thus, under full weight assignment, these envelope vertices in the torso would be assigned in whole to the skeleton elements in the arm and would be deformed and/or move with the arm, rather than with the torso. Even under a weighted assignment, these envelope vertices would be assigned to some degree to the arm and the torso envelope would undesirably deform or move to some extent with the arm.

Such incorrect assignments do not result in a realistic or acceptable animation and this has required the animation artist to manually reassign such vertices to appropriate skeleton elements to obtain a correct model. The amount of effort required to perform such manual reassignments can be significant and, in extreme cases, it can be more time effective for an animation artist to forgo any automated assignment of envelope vertices and to manually perform the assignment.

It is therefore desired to have a system and/or a method for assigning the vertices of an envelope to a skeleton which is flexible, versatile and which can reduce the incorrect or undesired assignment of vertices to skeleton elements.

SUMMARY OF THE INVENTION

It is an object of the present invention to provide a novel system and method of assigning the vertices of an envelope to the skeleton elements in models used with computer animation systems.

According to a first aspect of the present invention, there is provided a method of relating at least one envelope whose geometry is defined by a plurality of vertices, to one or more skeleton elements in a model used for animation, comprising the steps of:

(i) selecting a skeleton for an animation model, said skeleton comprising at least one skeleton element;

(ii) selecting a skeleton element from said skeleton;

(iii) defining at least one bounding volume for said selected skeleton element, said bounding volume defining a desired effective volume;

(iv) positioning said bounding volume relative to said selected skeleton element;

(v) selecting an assignment operation type for said bounding volume to define the operation of said assignment for envelope vertices located within said effective volume of said bounding volume;

(vi) repeating steps (iii) through (v) as desired;

(vii) repeating steps (ii) through (vi) as desired;

(viii) selecting a number "n" representing a maximum number of skeleton elements to which each vertex can be assigned; and (ix) after said at least one envelope has been positioned relative to said skeleton, assigning each vertex of said at least one envelope to no more than said "n" skeleton elements of said at least one skeleton elements which are located closest to said vertex, said assignments to each of said "n" skeleton elements being weighted in inverse proportion to a distance determined between each said skeleton element to said vertex and in accordance with said defined bounding volumes and said selected assignment operation types.

Preferably, the assignment operation types include at least an Exclusive type, wherein a vertex within a bounding volume of Exclusive type defined for a skeleton element is not assigned to said skeleton element, and an Inclusive type, wherein a vertex within at least one bounding volume of Inclusive type, each of the at least one bounding volumes of Inclusive type being defined for a different skeleton element, will only be assigned to these different skeleton elements.

According to another aspect of the present invention, there is provided a system for defining an animation model comprising a skeleton for said model to which at least one envelope including a plurality of vertices is to be associated, such that said at least one envelope moves with said skeleton in said animation, comprising:

skeleton definition means to define at least one skeleton member and at least one skeleton element associated therewith;

bounding volume definition means to define a bounding volume for said at least one skeleton element, said bounding volume defining a volume positioned relative to said at least one skeleton element and having an assignment type defined therefore;

assignment means operable to assign vertices of said at least one envelope to said at least one skeleton element of said skeleton, said assignment means operable to assign said vertices to a preselected maximum number of skeleton elements, said assignments for each said vertex being weighted inversely proportional to the relative determined distance between said vertex and each of said maximum number of skeleton elements, said assignment means being responsive to all bounding volumes defined for said at least one skeleton element such that each vertex located within at least one said volume of said bounding volumes is assigned according to said selected assignment type for each said bounding volume.

According to yet another aspect of the present invention, there is provided a method of assigning the vertices which define an envelope of an animation model to a skeleton in said animation model, comprising the steps of:

(i) defining a skeleton comprising at least one skeleton element;

(ii) defining at least one bounding volume for at least said at least one skeleton element, each said bounding volume defining an effective volume which is positioned relative to said at least one skeleton element;

(iii) selecting an assignment operation type for each said at least one bounding volume, said assignment operation type modifying the method employed to assign vertices located within the effective volume of each said at least one bounding volume;

(iv) selecting a maximum number of skeleton elements to which a vertex can be assigned;

(v) positioning at least one envelope relative to said skeleton for assignment thereto;

(vi) assigning the vertices of said at least one envelop which are not within a bounding volume to said selected maximum number of skeleton elements, said assignments being weighted inversely proportional to the determined distance between each vertex and each of said maximum number of skeleton elements;

(vii) assigning the vertices of said at least one envelope which are within a bounding volume according to the assignment operation type defined for said bounding volume.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

The present inventor has determined that the automated assignment of the vertices of an envelope to skeleton elements is generally improved when performed in a manner which includes a more comprehensive consideration of the skeleton geometry than mere proximity of the vertices and elements. Specifically, in an embodiment of the present invention the animation artist is provided with the ability to define at least one bounding volume for each skeleton element, the bounding volume being considered, as described below, in the automated assignment of vertices to the skeleton element.

Figure 1:
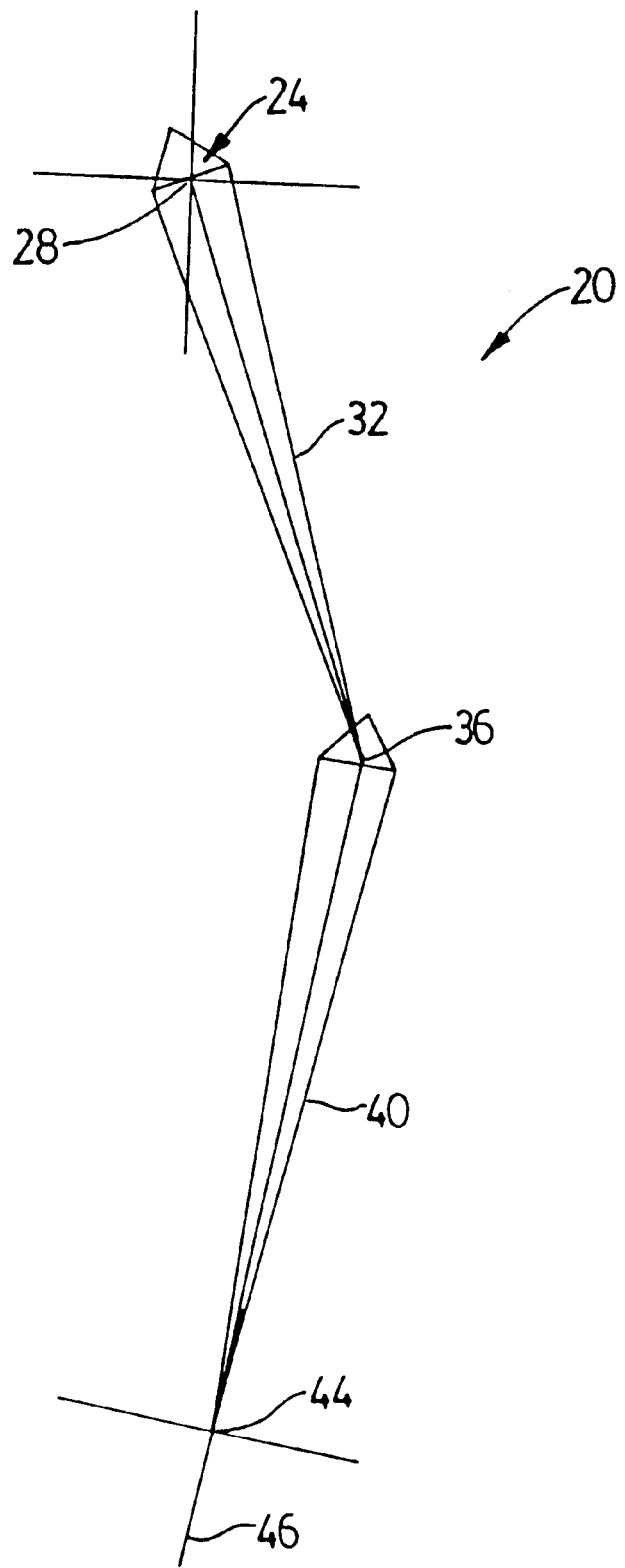
FIG. 1 shows a representation of a skeleton, comprising an articulated chain, used with an embodiment of the present invention.

FIG. 1 shows one representation of a skeleton 20 used in V3.5 of the SOFTIMAGE|3D product. As used herein, the term skeleton is intended to comprise a hierarchy of articulated chains, or a hierarchy of 3D objects, or a hierarchy comprising a mixture of both.

In FIG. 1, skeleton 20 comprises an articulated chain which includes a root 24, a null model 28 representing a first joint coincident with root 24, a first link 32, a joint 36, a second link 40 and an effector 44 with a coincident null model 46. Skeleton 20 can, for example, be used to model a human leg with root 24 attached to a skeleton (not shown) modelling the torso and another skeleton (not shown) modelling the foot and connected to effector 44.

Figure 2:
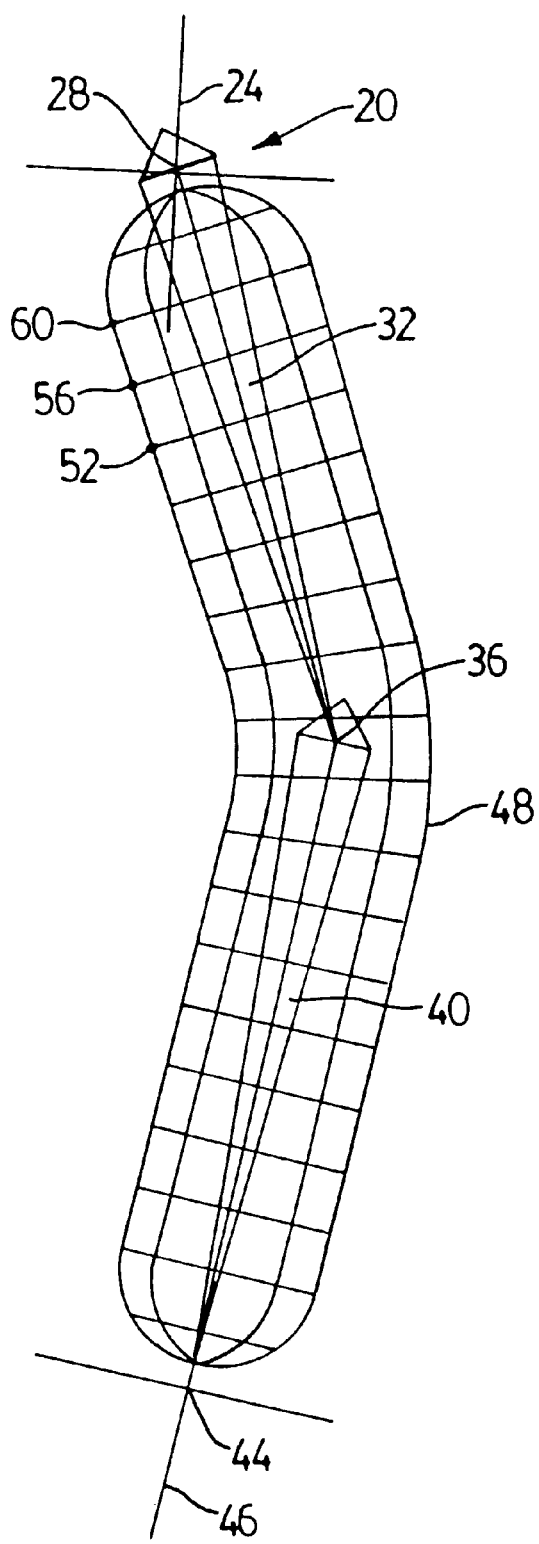
FIG. 2 shows the skeleton of FIG. 1 with an envelope placed thereabout.

In FIG. 2, a flexible envelope 48 of generally cylindrical shape has been placed about skeleton 20 and is ready for assignment of its vertices to either null model 28, joint 36 or null model 46. As mentioned above, in the prior art the assignment of vertices was accomplished by either full weight assignment or weighted assignment. In an example of the former method, vertices 52, 56 and 60 will be assigned to null model 28 with a 100% weighting as null model 28 is the closest skeleton element to these vertices. In an example of the latter method, with 'n' set at 2, vertex 52 will be assigned 72% to null model 28 and 28% assigned to joint 36, vertex 56 will be assigned 78% to null model 28 and 22% assigned to joint 36 and vertex 60 assigned 80% to null model 28 and 20% assigned to joint 36. With each method a similar assignment procedure is performed for each vertex of envelope 48.

Figure 3:
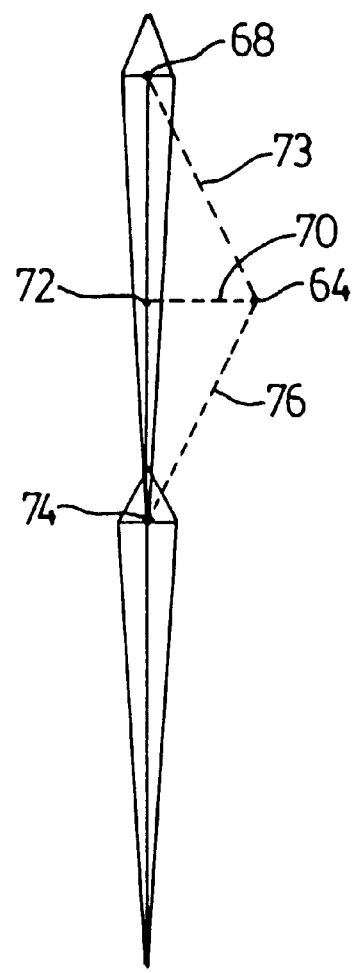
FIG. 3 shows the calculation of distances between a vertex of an envelope and elements of a skeleton of articulated chains.

FIG. 3 shows the presently preferred method of determining the distance between envelope vertices and skeleton elements in skeletons formed from articulated chains. In this method, the distance between a vertex and a joint is determined as being the perpendicular distance between the vertex and a straight datum extending from the skeleton element to the next skeleton element in the chain.

Thus, in FIG. 3 the determined distance between vertex 64 of an envelope (not shown) and joint 68 is defined as the perpendicular distance 70 between vertex 64 and point 72 on the datum extending from joint 68 to the next joint, in this example joint 74. The distance between vertex 64 and joint 74 is distance 76 (as vertex 64 is "before" joint 74) and the distance between vertex 64 and a preceding element in the chain, if any, would be distance 73 (as vertex 64 would be "after" the element).

The use of the projection of the vertex onto the straight datum to determine distances between vertices and skeleton elements is presently preferred for skeletons comprising articulated chains as these types of skeletons are commonly employed in modelling the limbs of animals, humans and the like. In such cases, this method of determining distances results in a "limb by limb" assignment which generally results in a more realistic envelope assignment result. Specifically, in the example of FIG. 3 the skeleton can be used to model a human arm with joint 68 representing the shoulder and joint 74 representing the elbow. Under conventional methods of determining distance, such as those employed in the present invention for skeletons of 3D objects or the like, vertex 64 would be assigned to each of joint 68 and 74 with approximately equal weighting (50%) as it is equidistant from the two joints. It has been found that this does not provide an assignment which results in a realistic model of a limb. However, when the vertex to joint distance is determined with the projection method described above, vertex 64 will be more heavily weighted to shoulder joint 68 than to joint 74, for example, with a 66% weighting to joint 68 and a 33% weighting to joint 74. This has been found to generally result in an assignment which models a limb more realistically.

For skeletons of 3D objects or the like, a datum point is specified for each object (typically the volumetric center of the object) and the distance is determined as the distance between the vertex and the datum point.

Once the assignment is completed, the animation artist can alter the assignments to unassign vertices from a skeleton element, reassign vertices to a different skeleton element or alter assignment weightings for vertices, although such manual alterations can require significant labour on the part of the animation artist, as mentioned above.

Figure 4:
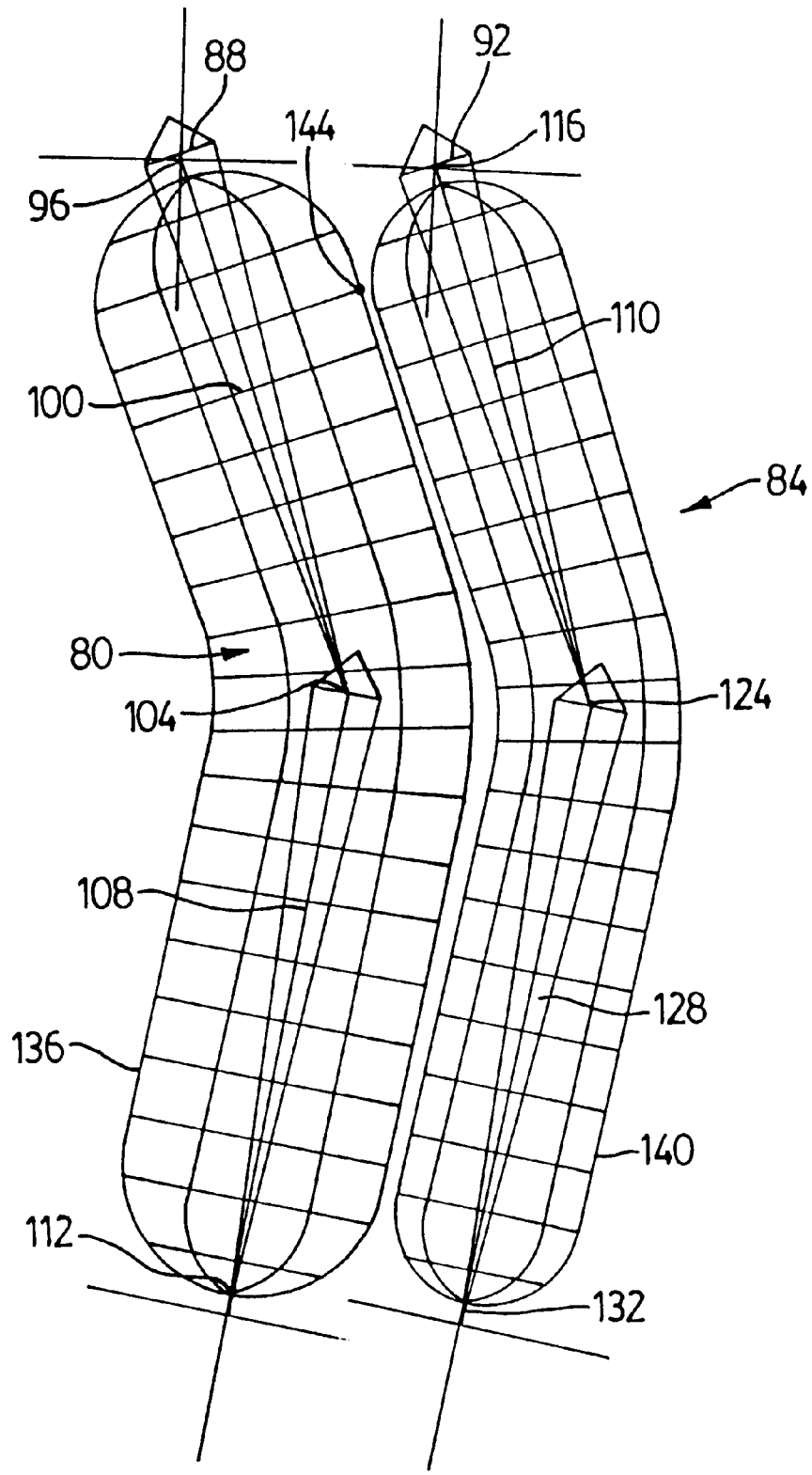
FIG. 4 shows a pair of skeletons and envelopes placed thereabout.
Figure 5:
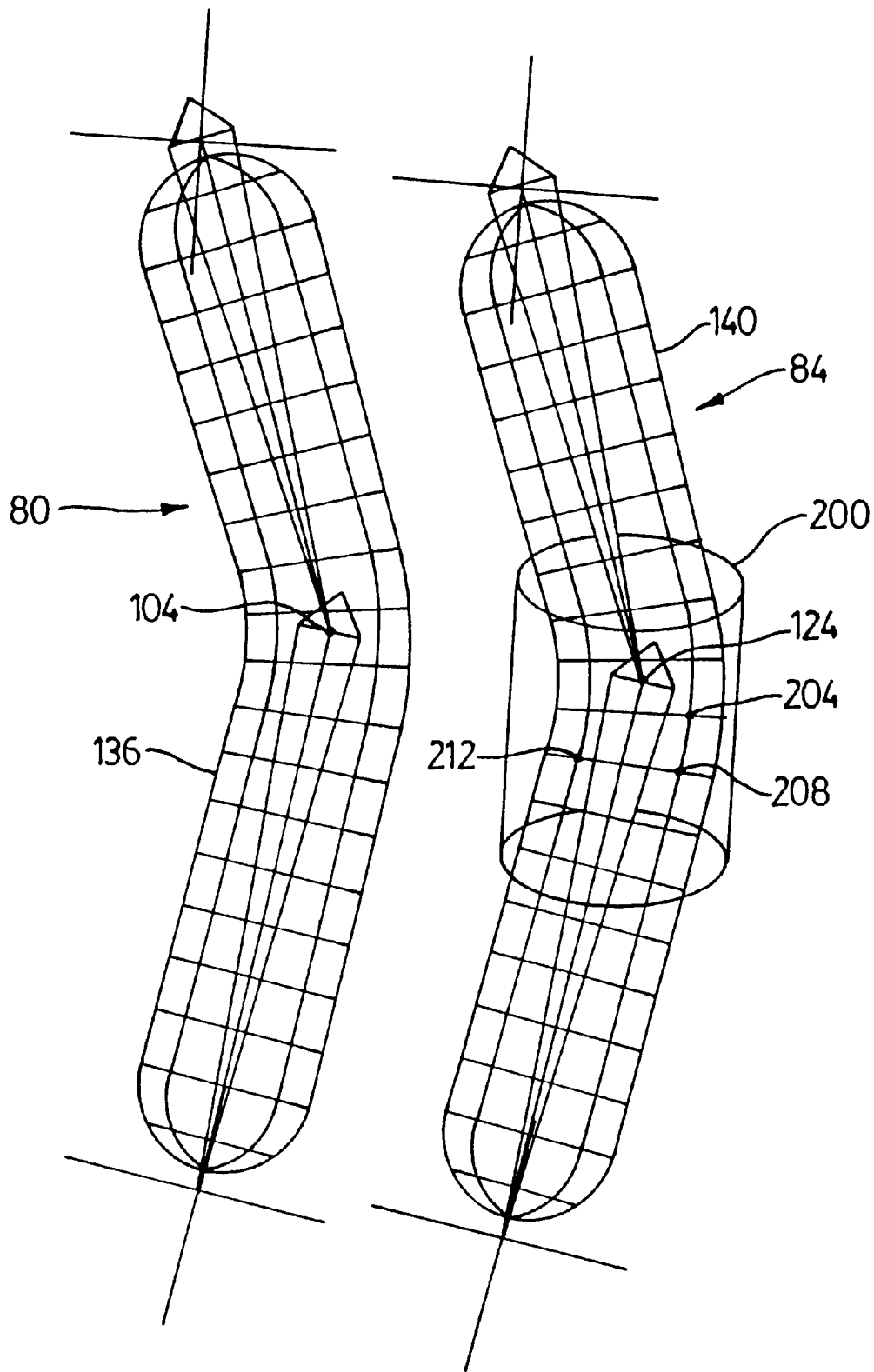
FIG. 5 the pair of skeletons of FIG. 4 wherein one envelope has been resized and wherein a generally cylindrical shaped bounding volume has been defined in accordance with an embodiment of the present invention.
Figure 6:
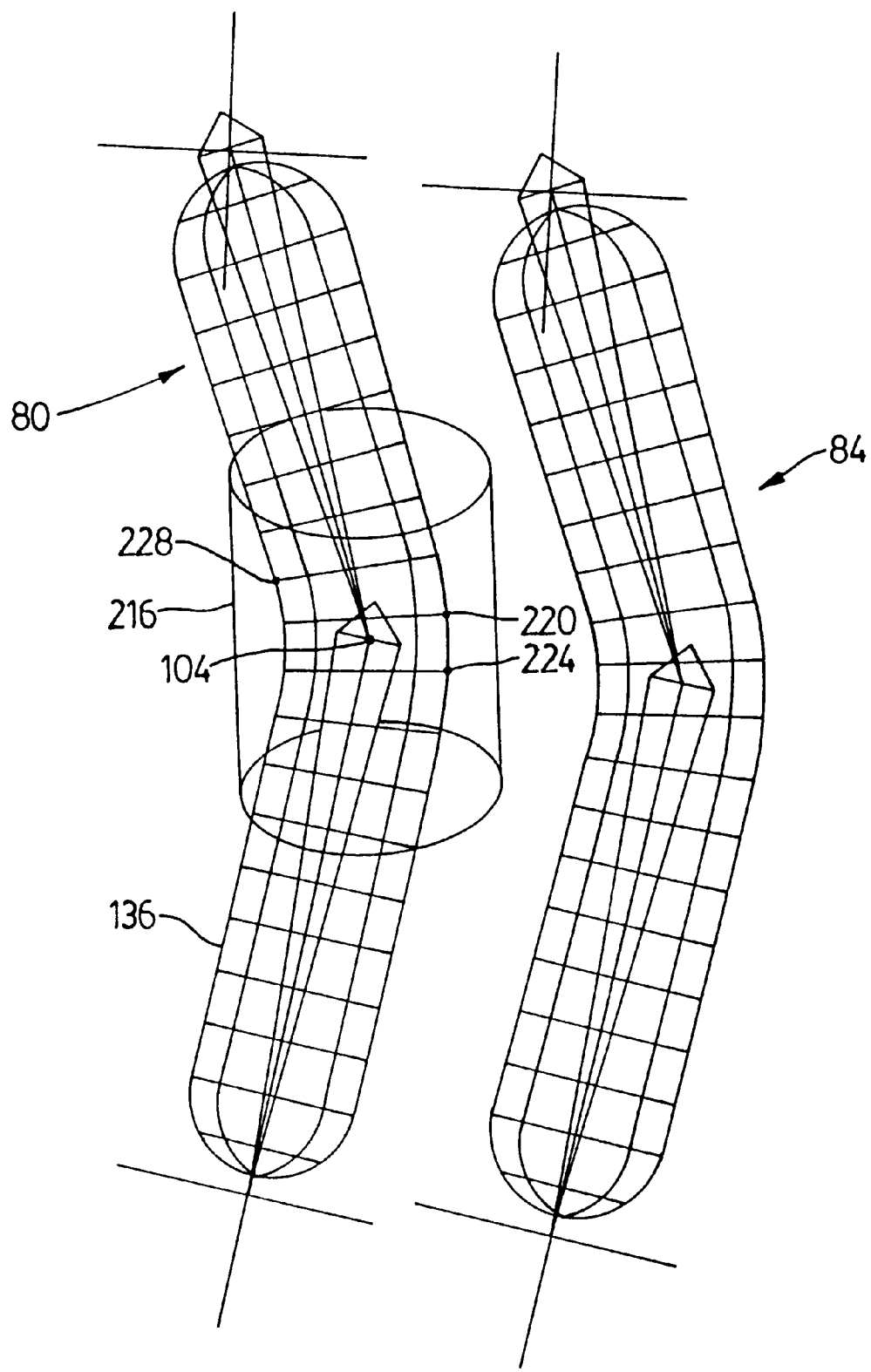
FIG. 6 shows the pair of skeletons and envelopes of FIG. 5 wherein a generally cylindrical shaped bounding volume has been defined in accordance with another embodiment of the present invention.
Figure 7:
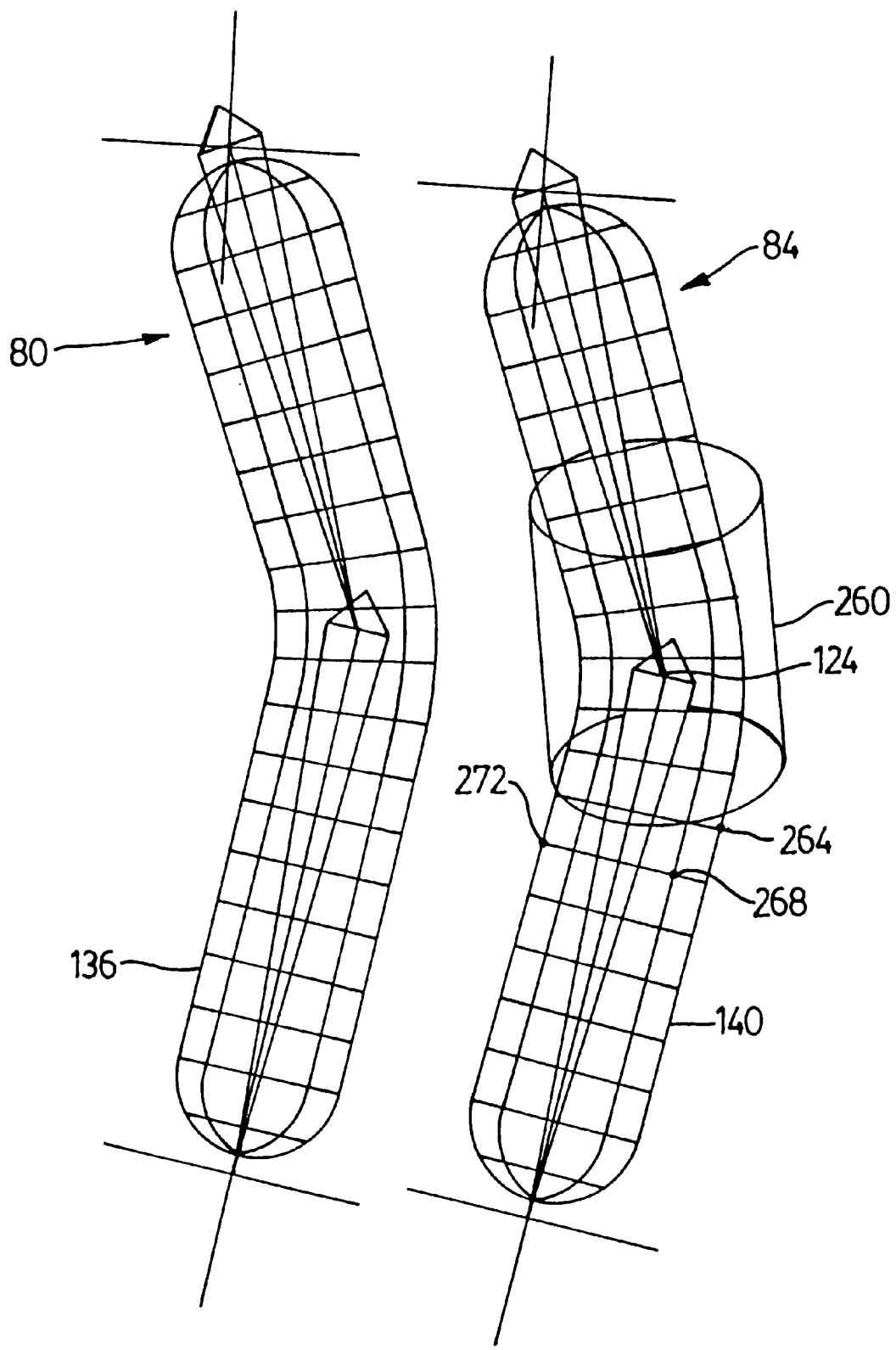
FIG. 7 shows the pair of skeletons and envelopes of FIG. 5 wherein a generally cylindrical shaped bounding volume has been defined in accordance with another embodiment of the present invention.

FIG. 4 shows a pair of skeletons 80 and 84 which can be used to model human fingers or the like. Each skeleton 80,84 includes a root, 88 and 92 respectively, which will be linked to a skeleton of the palm of the hand (not shown). Skeleton 80 includes a null model 96, a first link 100, a joint 104, a second link 108, and an effector 112. In a similar manner, skeleton 84 includes a null model 116, a first link 120, a joint 124, a second link 128, and an effector 132. Flexible envelopes 136 and 140 have been placed about each skeleton 80, 84 respectively.

As will be apparent, if either of the prior art assignment methods is employed with the arrangement of FIG. 4, unsatisfactory results can occur. For example, some vertices on envelope 136 are closer to skeleton elements on skeleton 84 than they are to elements of skeleton 80 on which envelope 136 has been placed. Specifically, vertex 144 is closer to null model 116 on skeleton 84 than it is to null model 96 on skeleton 80 and will thus be assigned, either in whole or in part depending upon the assignment method, to null model 116 on skeleton 84. This will result in the undesired movement of portions of envelope 136 with skeleton 84 much as if there was webbing between the fingers.

Depending upon the particular geometry of the skeletons at the time when the assignment is made, many other vertices may be incorrectly assigned, requiring significant time and/or effort on the part of the animation artist to correct the assignments.

As mentioned above, to mitigate the mis-assignment of the vertices, the present inventor has developed an assignment method which provides for the use of one or more bounding volumes in assigning vertices. A bounding volume is a volume which can be defined for any skeleton element or elements. Essentially, each bounding volume is defined for a skeleton element and can encompass part or all of an envelope or envelopes and influences the assignment of the vertices of the envelope or envelopes within its volume to the skeleton element for which it is defined. This will be described in more detail below.

In a present embodiment of the present invention, bounding volumes are available in three default configurations, namely cylinders, boxes and spheres, however each of these default shapes can be customized as needed by the animation artist by moving vertices of the bounding volume as desired. In FIGS. 5 through 9, discussed below, the bounding volumes are shown without displayed vertices for clarity, however those of skill in the art will understand that in actual use, modification of the geometry of a bounding volume can be easily performed, as desired. The bounding volume is sized, shaped and located such that a portion of interest on an envelope is within its effective volume. Further, in FIGS. 5, 6 and 7, envelope 136 of skeleton 80 has been resized, for clarity, to the same radius as envelope 140.

Presently, three different types of assignment operation are available for use with bounding volumes, Exclusive assignment, Inclusive assignment and Inclusive Limit assignment. Each of these assignment operation types are described in detail below.

If an Exclusive assignment is selected, then all vertices within the bounding volume are prevented from being assigned to the skeleton element for which the bounding volume has been defined. For example, in the situation shown in FIG. 5, a cylindrical bounding volume 200 has been defined for joint 104 of skeleton 80, and placed about envelope 140. Under Exclusive Assignment, the vertices of envelope 140 within bounding volume 200, such as vertices 204, 208, 212, etc., will not be assigned to joint 104.

If an Inclusive assignment is selected, then any vertex falling within the bounding volume's volume is assigned 100% to the skeleton element for which the bounding volume has been defined. For example, in FIG. 6 a cylindrical bounding volume 216 has been defined for joint 104 and placed about envelope 136 adjacent joint 104. Under Inclusive assignment, the vertices of envelope 136 within bounding volume 216, such as vertices 220, 224 and 228, are assigned 100% to joint 104.

If an Inclusive Limit assignment is selected, then any vertex outside of the bounding volume will not be assigned to the joint for which the bounding volume has been defined. For example, in FIG. 7 a cylindrical bounding volume 260 has been defined for joint 124 and placed about envelope 140 adjacent joint 124. Under Inclusive Limit assignment, the vertices outside of bounding volume 260, such as vertices 264, 268 and 272, are not assigned to joint 124. Inclusive Limit assignment was available in V3.0 of SOFTIMAGE|3D as the only type of modifier available for the automatic assignment operation, but it was determined to be quite limited and somewhat non-intuitive to use.

Figure 8:
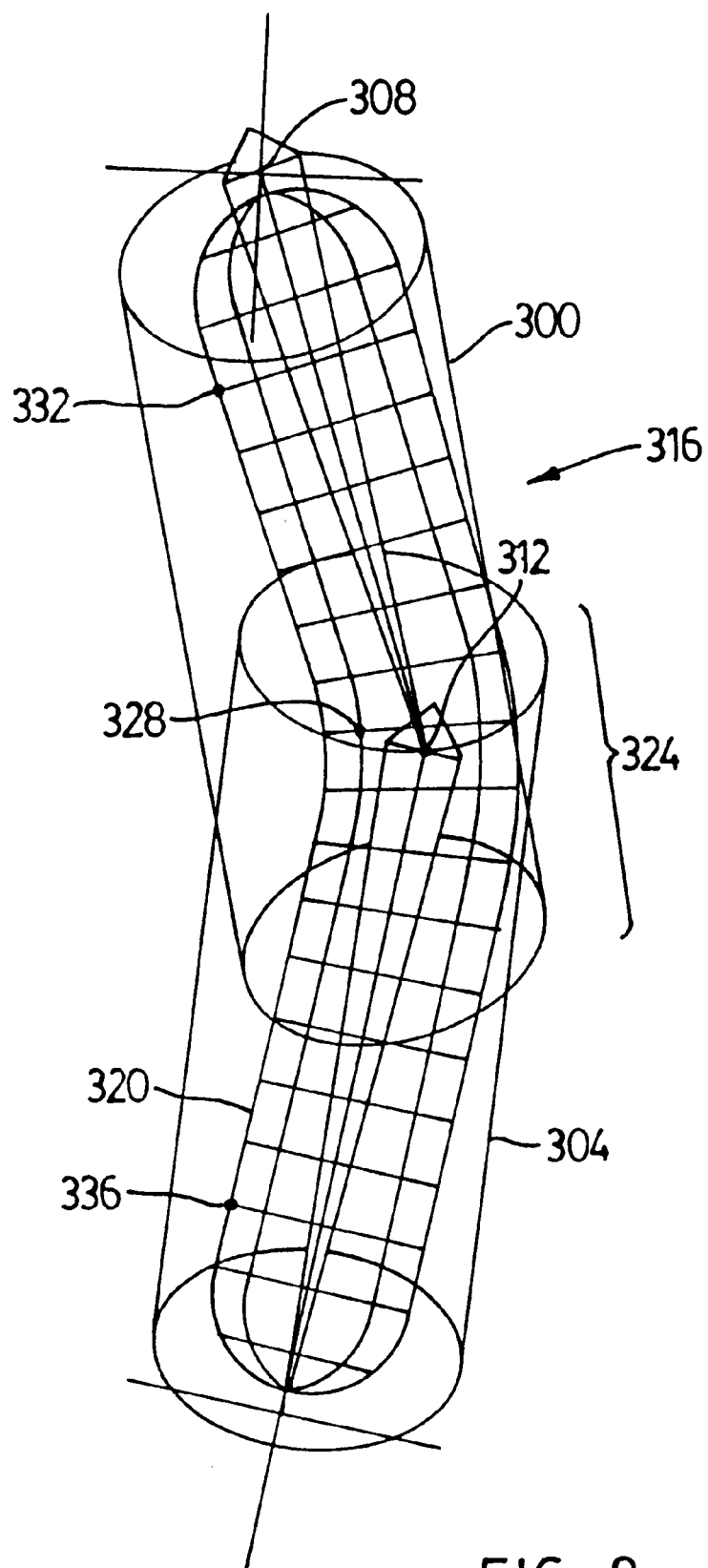
FIG. 8 shows another skeleton with an envelope placed thereabout wherein two generally-cylindrical and overlapping bounding volumes have been defined.

In the present invention, the Assignment operation types may be combined as desired to provide versatile and powerful automated assignment. For example, FIG. 8 shows a pair of bounding volumes 300 and 304 each of which is defined for a respective skeleton element (null model) 308 and 312 of a skeleton 316. When Inclusive assignment is selected for bounding volumes 300 and 304, the vertices of envelope 320 in the overlapped portion 324 of the bounding volumes are assigned to both of skeleton elements 308 and 312 with weightings inversely proportional to their distance from each skeleton element. For example, vertex 328 can be assigned to skeleton element 308 with a 55% weighting and to skeleton element 312 with a 45% weighting.

The vertices within bounding volume 304 but outside of overlapped portion 324 are assigned 100% to skeleton element 312 and the vertices within bounding volume 300 but outside of overlapped portion 324 are assigned 100% to skeleton element 308. For example, vertex 332 is assigned 100% to skeleton element 308 and vertex 336 is assigned 100% to skeleton element 312.

Figure 9:
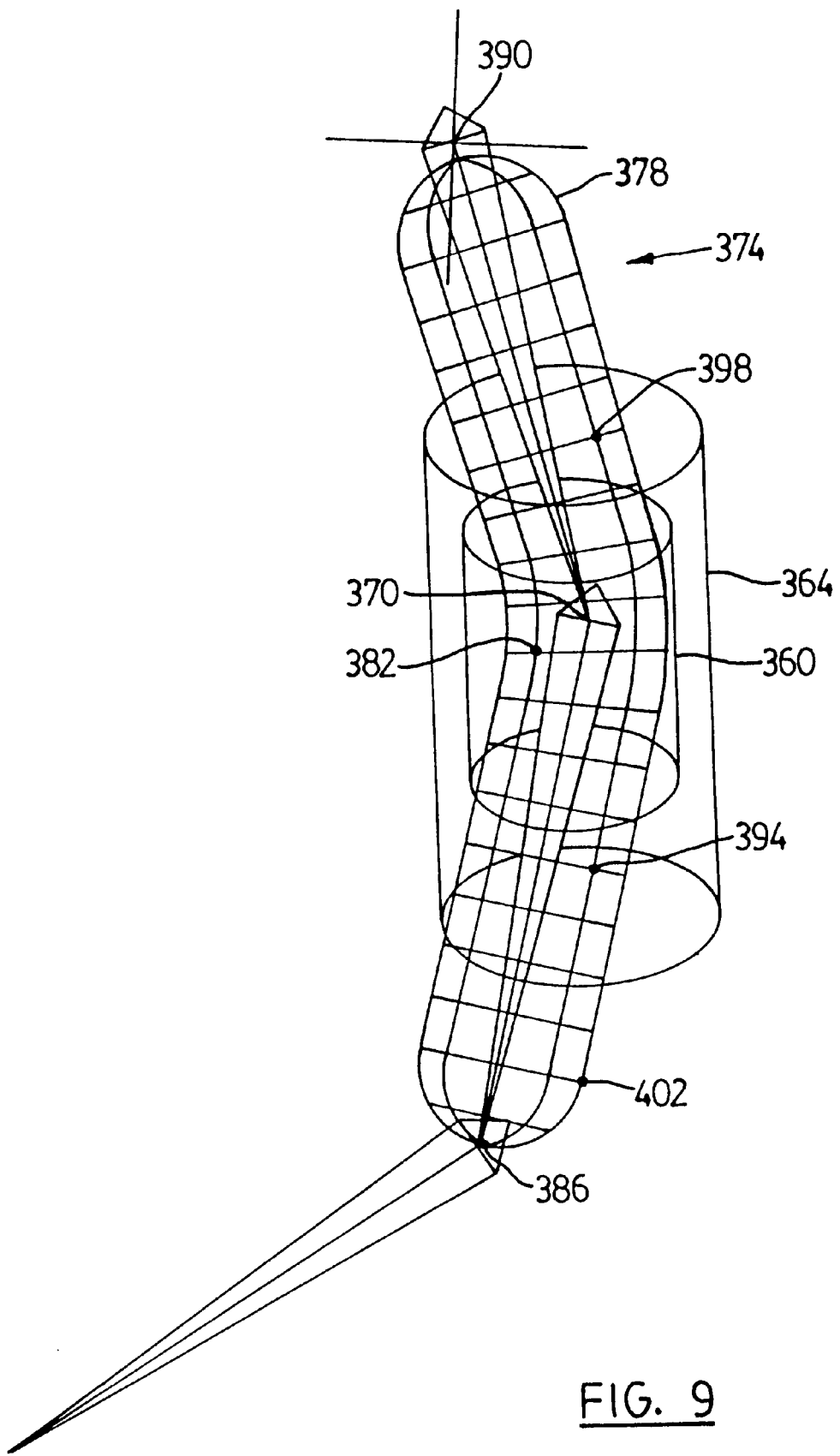
FIG. 9 shows another skeleton with an envelope placed about a portion thereof wherein two generally-cylindrical and coaxial bounding volumes have been defined.

FIG. 9 shows an example with two bounding volumes 360 and 364 each of which is defined for a joint 370 on a skeleton 374. Inclusive assignment has been selected for bounding volume 360 and thus all vertices of the envelope 378 within bounding volume 360 are assigned 100% to joint 370. For example, vertex 382 is assigned 100% to joint 370. Inclusive Limit assignment has been selected for bounding volume 364 and thus all vertices of envelope 378 within bounding volume 364 but outside of bounding volume 360 will be assigned to joint 370 and to other skeleton elements, such as first joint 390 and any other valid skeleton elements, on a weighted basis inversely proportional to their distance from the respective elements. For example, vertex 394 will be assigned 80% to joint 370 and 20% to joint 386. Similarly, vertex 398 will be assigned 32% to joint 370 and 68% to joint 390.

In this example, the vertices of envelope 378 which are outside of bounding volume 364 cannot be assigned to joint 370 and are thus assigned, on a weighted basis, to the other skeleton elements in skeleton 374. It will be apparent to those of skill in the art that, while a vertex such as vertex 402 will in fact be assigned to both joint 386 and joint 390, the relative distances between these elements and vertex 402 is such that vertex 402 will be assigned to joint 386 with a weighting which is effectively 100%, i.e.—99.99% to joint 386 and 0.01% to joint 390. As will be apparent, due to the presence of bounding volume 364 and its Inclusive Limit assignment, vertex 402 effectively does not "see" joint 370 for assignment purposes.

Various other combinations of bounding volumes and assignment types will occur to those of skill in the art and can be usefully employed in the automated assignment of the vertices of envelopes to skeleton elements.

Figure 10:
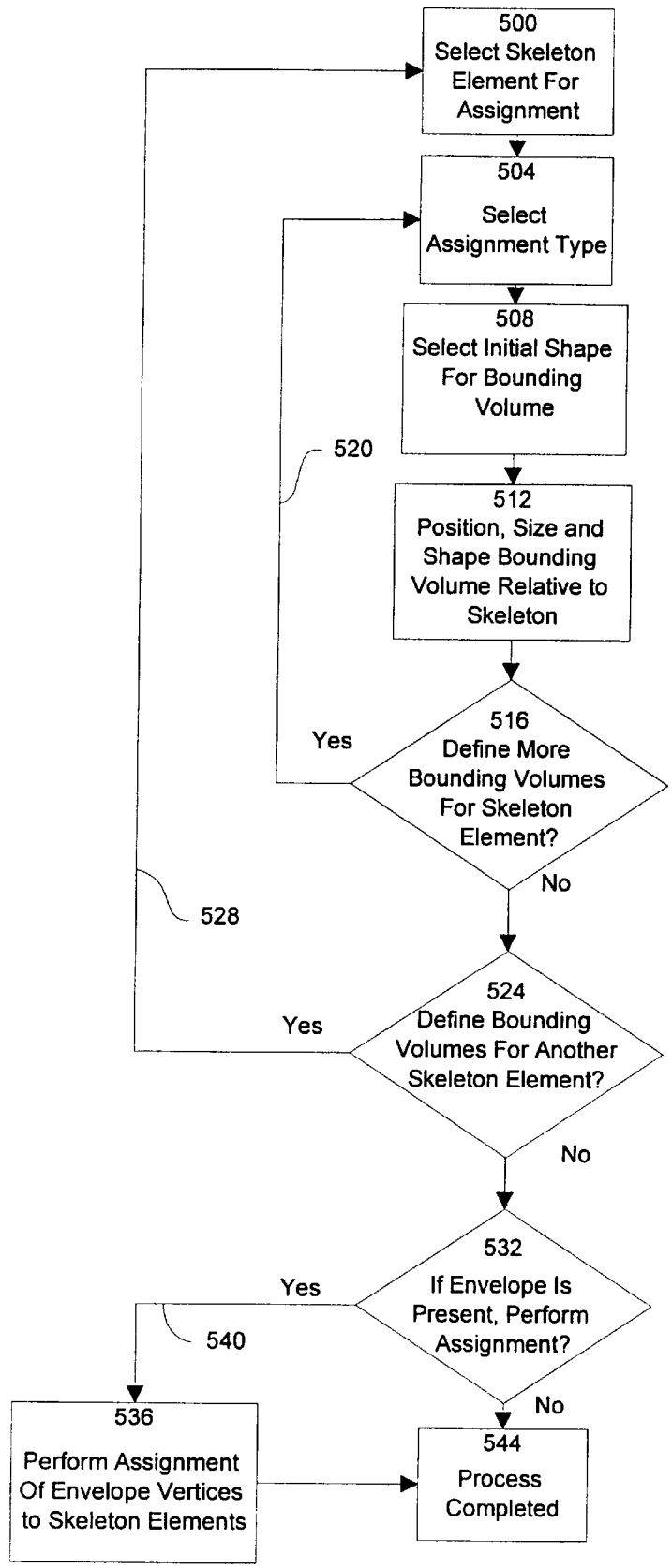
FIG. 10 shows a flowchart representing the process of employing bounding volumes in accordance with an embodiment of the present invention.

FIG. 10 shows a flowchart representing the use of bounding volumes in accordance with embodiments of the present invention, as shown in FIGS. 11 through 18 and discussed below. Generally, it is contemplated that the definition of bounding volumes for a skeleton will be performed after an envelope has been placed on the skeleton, however this is not required. As mentioned above, bounding volumes are defined for and positioned relative to skeleton elements and are independent of the envelope to be assigned. Thus, while it is contemplated that it will be preferred to have an envelope placed on the skeleton prior to the definition of the bounding volumes, to assist in visualizing how the automated assignment will proceed, this is not required.

In FIG. 10 at step 500, the user selects a skeleton element for which it is desired to define a bounding volume. This selection can be accomplished in a variety of manners, but in a present embodiment of the invention the skeleton element is selected by the user via a mouse click on the skeleton element of interest on a graphically displayed representation of the skeleton. At step 504, the user selects the Assignment operation type (Inclusive, Inclusive Limit, or Exclusive) which is to be used for the bounding volume. Again, this selection can be accomplished in a variety of manners, but in a present embodiment of the invention the Assignment operation type is selected from an appropriate set of drop down menus associated with the graphically displayed representation of the skeleton.

Figure 11:
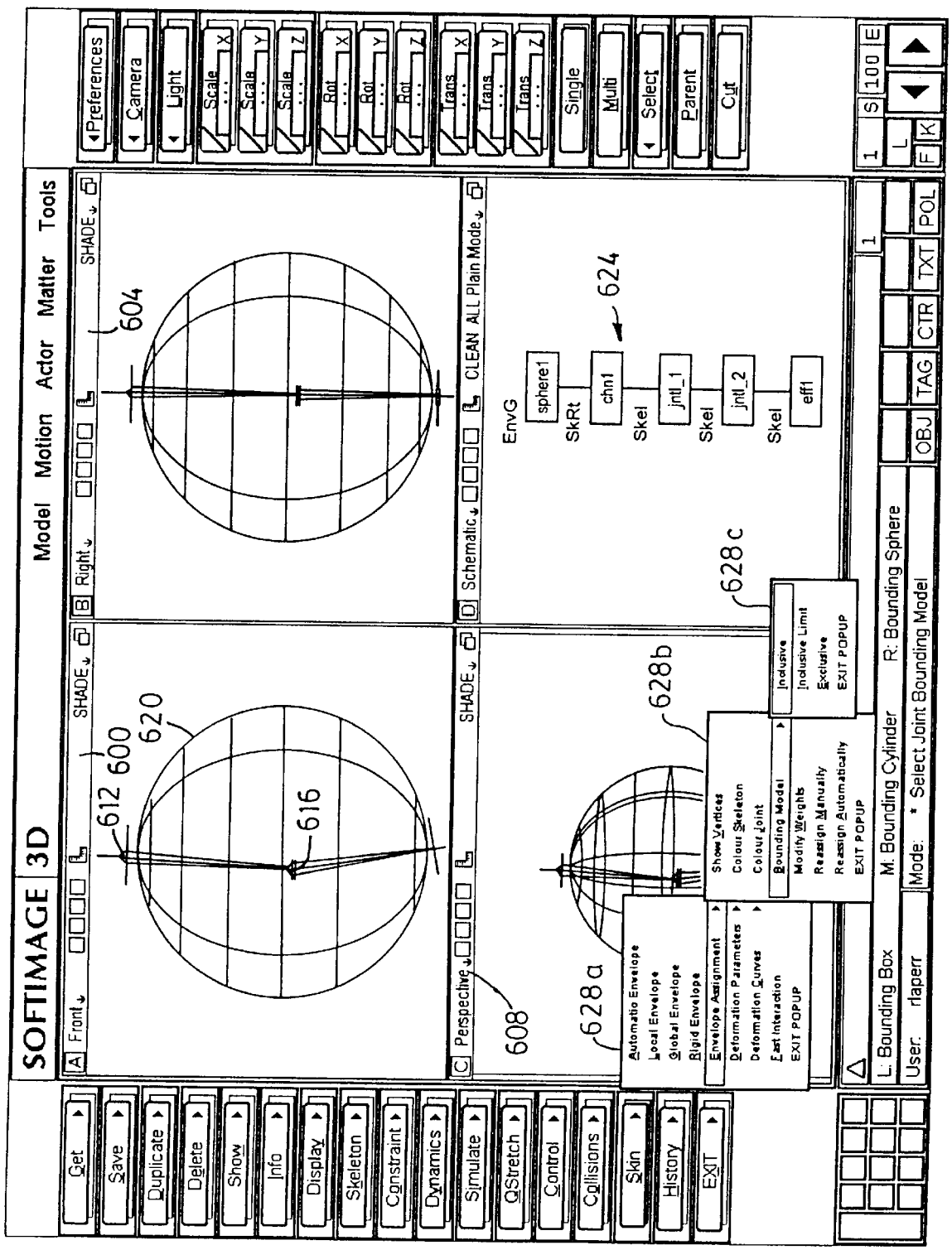
FIG. 11 shows the definition of a bounding volume type with a user interface in accordance with an embodiment of the present invention.

FIG. 11 shows the user interface from Version 3.5 of SOFTIMAGE|3D and shows Front 600, Right Side 604 and Perspective 608 views of a skeleton with joints 612 and 616 and about which a spherical envelope 620 has been positioned. A schematic representation of the skeleton hierarchy is shown at 624 wherein envelope 620 is identified as "sphere1", joint 612 is identified as "jnt1_1" and joint 616 is identified as "jnt1_2".

Also shown in FIG. 11 are the drop down menus 628a, 628b and 628c of the Assignment Type selection operation of step 504. In this Figure, the user has selected joint 616 and has selected an Inclusive type operation for the bounding volume to be defined for that joint.

Figure 12:
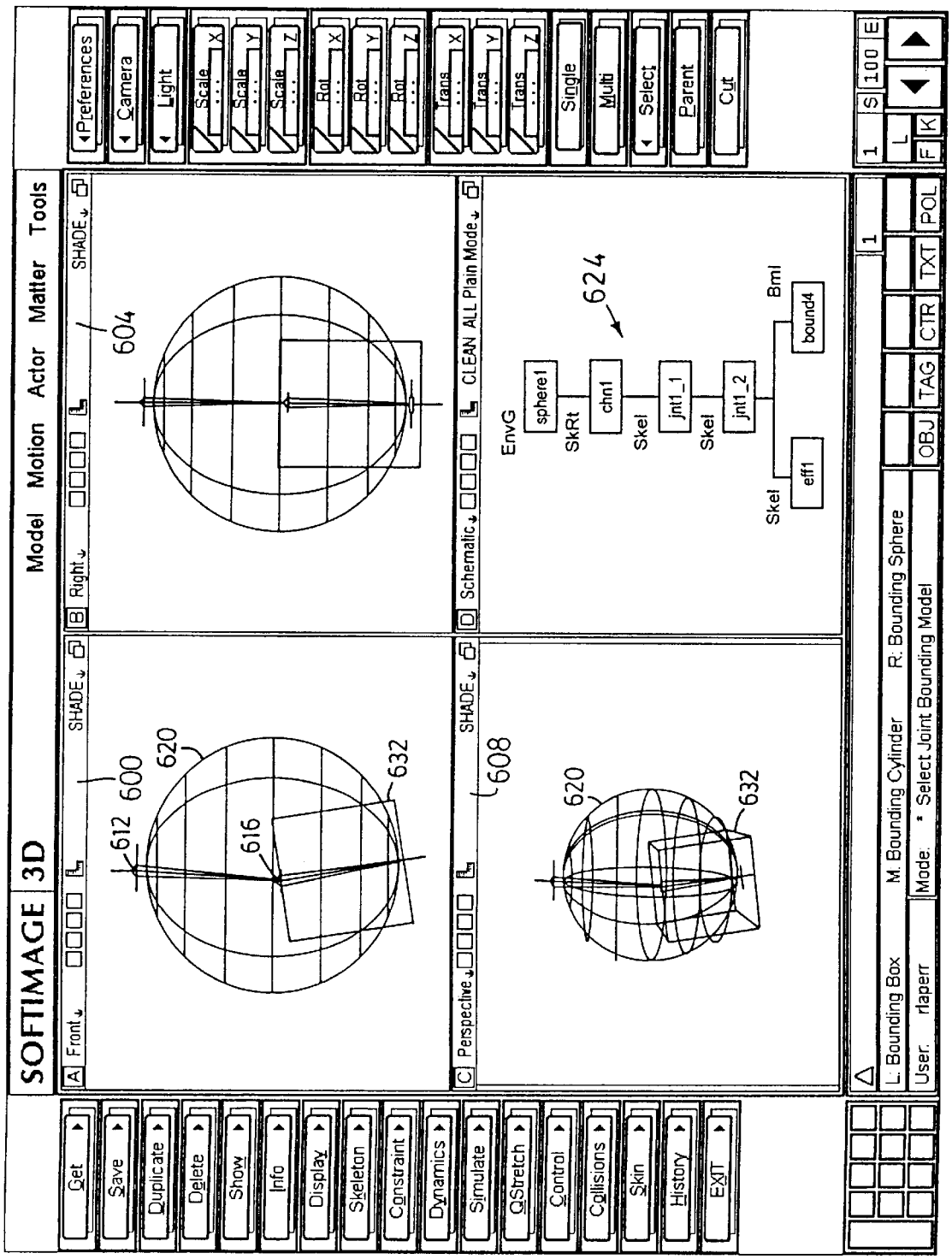
FIG. 12 shows the placement of a bounding volume with the user interface of FIG. 11.

After the Assignment operation type is selected at step 504, the user then selects the initial shape (cylinder, sphere or cube) for the bounding box at step 508. At step 512 the user then positions the bounding volume with respect to the selected skeleton element and envelope, if present, modifying the size and shape of the bounding volume as required. FIG. 12 shows the skeleton of FIG. 11 wherein a box (cubical) bounding volume has been selected and positioned relative to joint 616 and envelope 620. As will be apparent, the schematic representation 624 of the hierarchy is updated to reflect the definition of the bounding volume 632 for joint 616.

Figure 13:
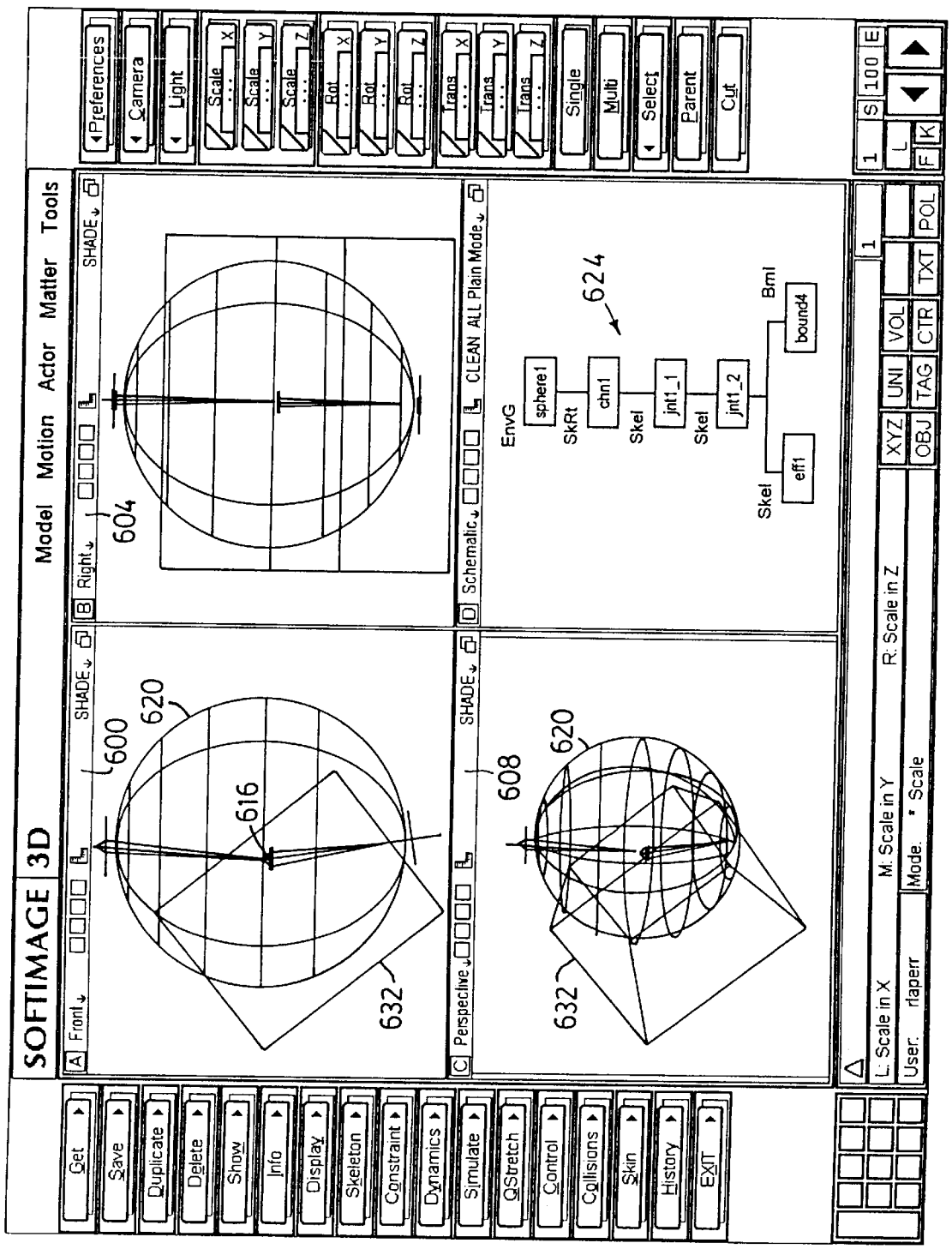
FIG. 13 shows transformation of the bounding volume of FIG. 12.
Figure 14:
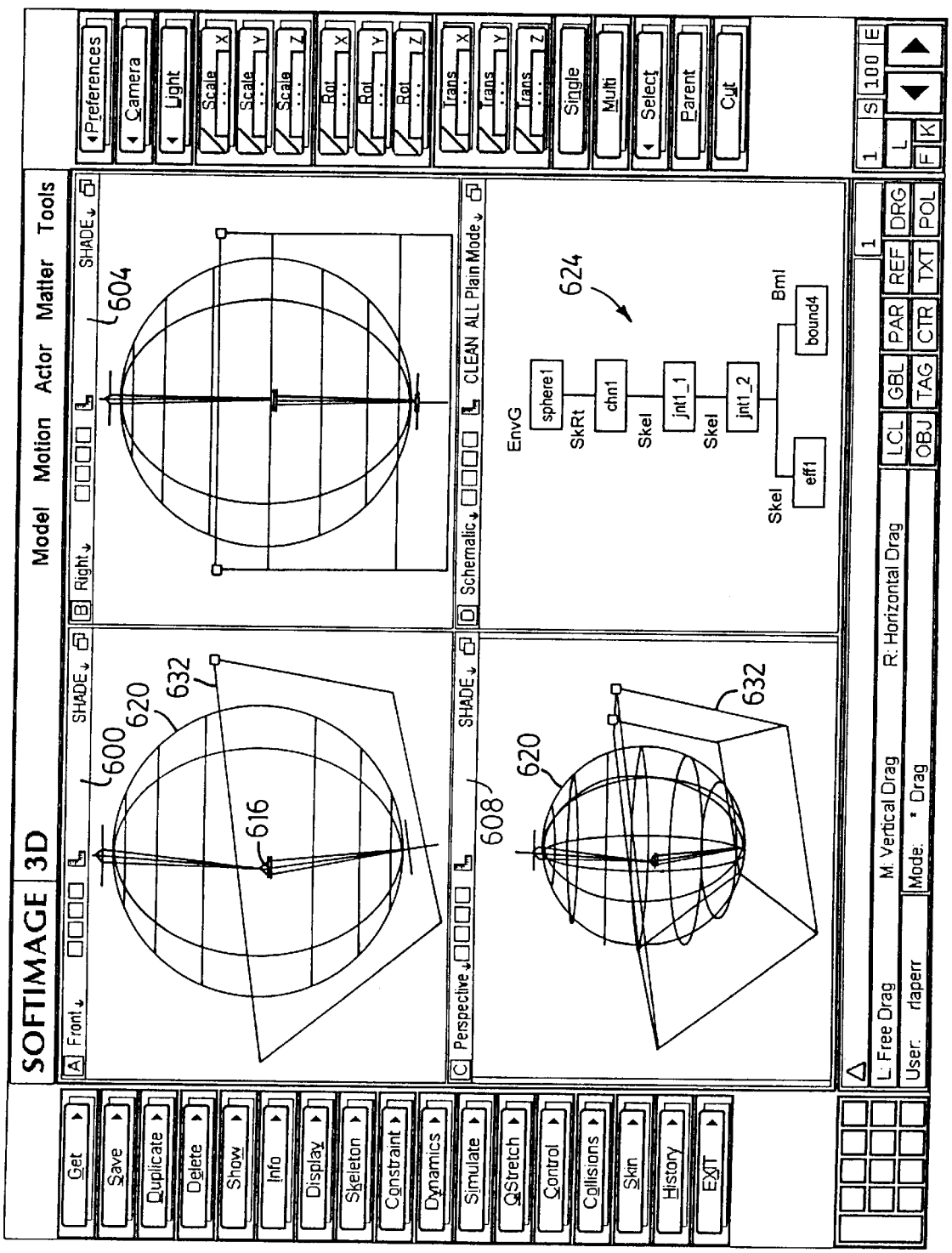
FIG. 14 shows modification of the geometry of the bounding volume of FIG. 12.

As shown in FIG. 13, bounding volume 632 can be transformed, by scaling, rotation or translation, as desired by the user. As shown in FIG. 14, the geometry of bounding volume 632 may also be modified as desired by the user. In version 3.5 of SOFTIMAGE|3D, only box bounding volumes can have their geometry changed but the present invention is not so limited and it is contemplated that the modification of the geometry of any bounding volume can be implemented, if desired.

When the placement and arrangement of the bounding volume is acceptable, the user is then offered, at step 516, the choice of defining another bounding volume for the selected skeleton element. If the user wishes to define another bounding volume for the skeleton element, the process reverts to step 504, as indicated by arrow 520. If the user has finished defining bounding volumes for the selected skeleton element, either temporarily or permanently, the process continues at step 524 with the user being offered the choice to define one or more bounding volumes for another skeleton element. If this is desired by the user, the process reverts to step 500 as indicated by arrow 528, otherwise the process continues to step 532.

At step 532, if an envelope is present, the user is offered the choice of automatically assigning, or re-assigning, the vertices of the envelope in accordance with the defined bounding volumes. If the user indicates that assignment is to be performed, then the process proceeds to step 536, as indicated by arrow 540, wherein assignment is performed as described above. If no envelope is present, or if the user wishes to defer the assignment operation, the process terminates at step 544.

Figure 15:
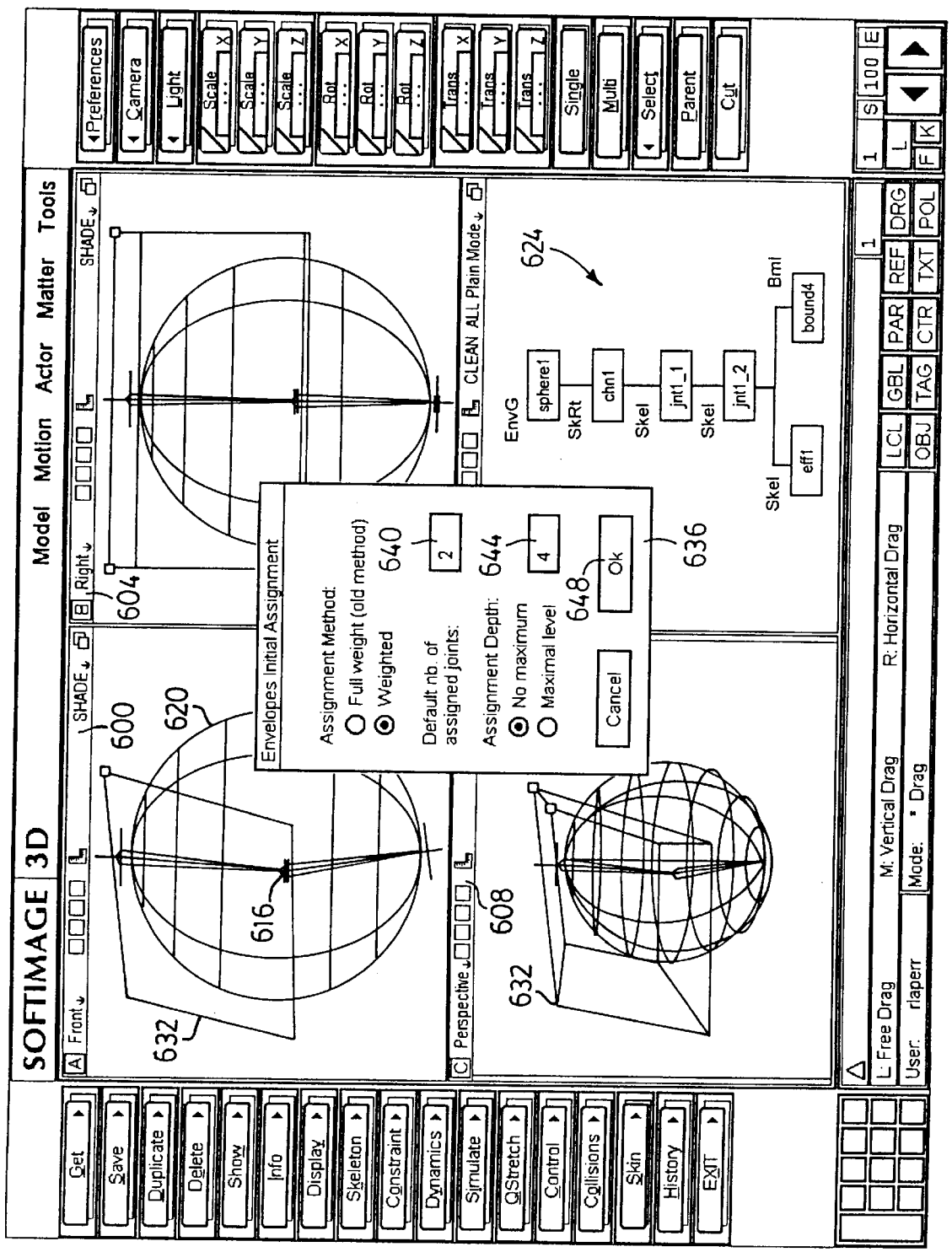
FIG. 15 shows the assignment of vertices of an envelope to a skeleton, in accordance with an embodiment of the present invention.

In FIG. 15, user has shaped, sized and positioned bounding volume 632 as desired and has initiated the assignment process by selecting the "Reassign Automatically" option from menu 628b (in FIG. 11). The Envelope Assignment dialog box 636 is then presented to the user to allow the assignment method to be selected from "Full Weight" (i.e.— vertex assigned 100% to a single element) or "Weighted". If "Weighted" is selected, the user selects the default (maximum) number 640 of elements to which each vertex is to be assigned. The user can also select the assignment depth 644 which the assignment operation is to consider. Each element defines a level in a skeleton hierarchy and the assignment depth allows the user to exclude one or more levels in the hierarchy from consideration by the assignment process. The default value for the assignment depth is the number of levels in the skeleton hierarchy, i.e.—all levels of the hierarchy are included by the assignment process. Next the user selects the "OK" button 648 to initiate the assignment.

Figure 16:
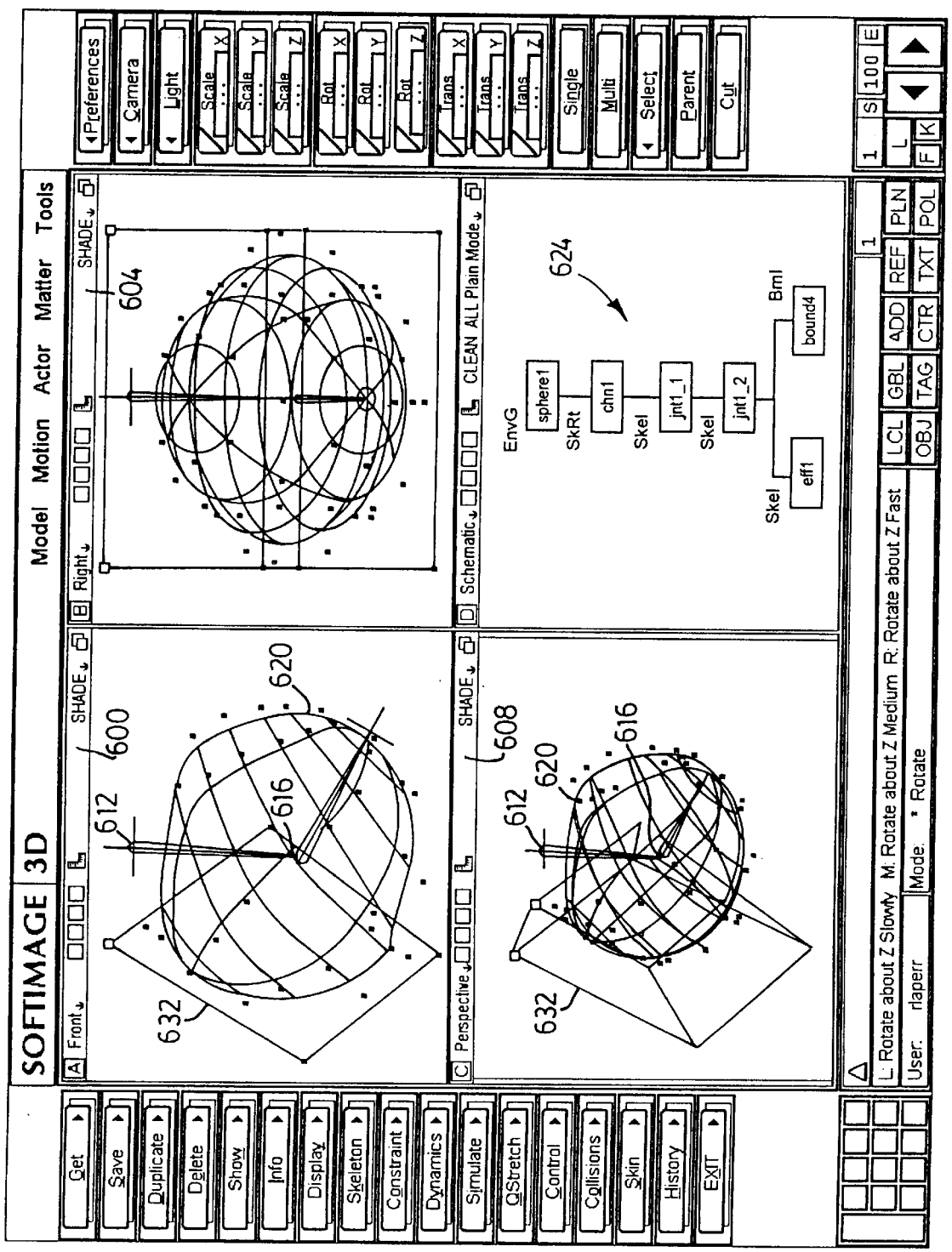
FIG. 16 shows the deformation of the assigned envelope of FIG. 15 after movement of the skeleton.

In the example shown in FIG. 15, the vertices of envelope 620 within Inclusive bounding volume 632 are assigned 100% to joint 616 and thus will move with exclusively with it. The remaining vertices of envelope 620 are assigned on a weighted basis to both joint 612 and 616. FIG. 16 shows the resulting deformation of envelope 620 as joint 616 is rotated.

Figure 17:
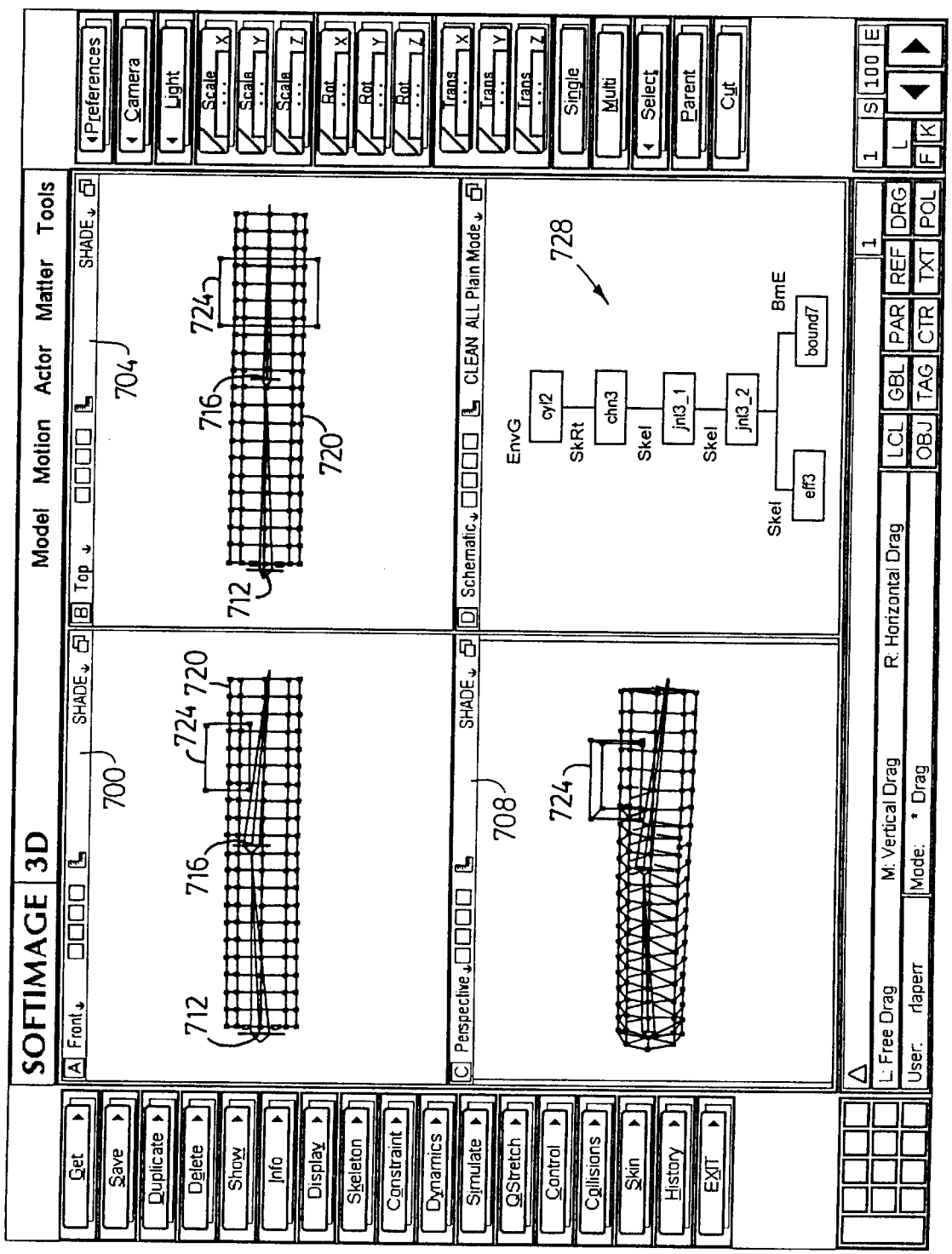
FIG. 17 shows another example of an assignment of an envelope to a skeleton in accordance with another embodiment of the present invention.
Figure 18:
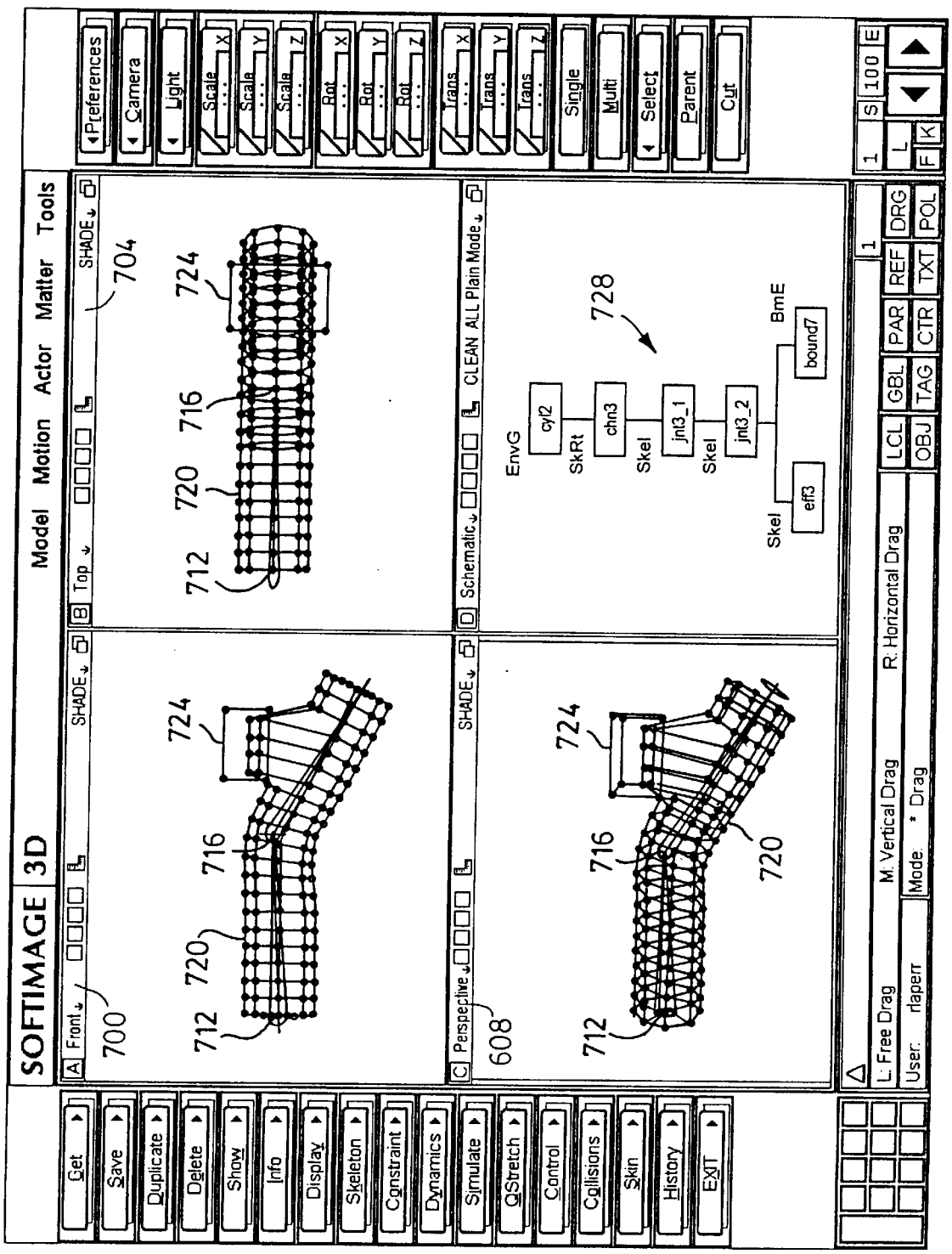
FIG. 18 shows the deformation of the assigned envelope of FIG. 17 after movement of the skeleton.

An example of an Exclusive type bounding volume is shown in FIGS. 17 and 18. FIG. 17 shows a Front 700, Top 704 and Perspective 708 view of skeleton with two joints 712 and 716 and about which a cylindrical envelope 720 has been positioned. A box bounding volume 724 has been defined for joint 716 and positioned as shown. A schematic representation 728 of the hierarchy of this skeleton is also shown. An Exclusive assignment type has been selected by the user for bounding volume 724 and the assignment operation performed with the effect that the vertices of envelope 720 within bounding volume 724 cannot be assigned to joint 716 and are thus assigned, with 100% weighting, to joint 712. The remaining vertices of envelope 720 are assigned to joints 712 and 716 on a weighted basis. FIG. 18 shows the resulting deformation of envelope 720 as joint 716 is rotated.

The assignment process 536 will now be described, with reference to the flowchart of FIGS. 19a and 19b. Generally, the assignment process proceeds on a vertex by vertex basis for each envelope, with each skeleton element being considered in turn for each vertex, before proceeding to the next vertex and with each bounding volume defined for each skeleton element being examined prior to assigning the vertex under consideration to any skeleton elements. For each vertex, one of two lists is produced by the assignment process. Specifically, either an "Included List" is produced which includes all skeleton elements to which the vertex is forced to be assigned or a "Not Included List" is produced which lists all skeleton elements to which the vertex can be assigned.

More specifically, at step 800, the assignment process commences with a first vertex (V) of an envelope. At step 804, a first skeleton element (E) is selected and at step 808 a determination is made as to whether E has a bounding volume (BV) defined for it of Exclusive assignment type and, if it does, is V is within that bounding volume? If these conditions are met, further consideration of E is terminated and processing proceeds, as indicated by arrow 812, to step 832 wherein a determination is made as to whether all E's have been considered for V.

If the tests at step 808 are not met, the process proceeds to step 816 wherein a determination is made as to whether E has one or more bounding volumes defined for it of Inclusive Limit type and, if it does, ais V inside at least one of them? If these conditions are not met, further consideration of E is terminated and processing proceeds, as indicated by arrow 818, to step 832.

If the tests at step 816 are met, the process proceeds to step 820 wherein a further determination is made as to whether V is inside a bounding volume defined for E of Inclusive type. If V is inside such an inclusive type bounding volume, an entry is made, at step 822, in the "Included List" maintained for V of all E's to which V is forced to be assigned and this entry includes the distance between E and V. If an "Included List" does not exist for the V, one is created at this point and the appropriate entry made in it.

Once the entry is made at step 822, if a "Not Included List" exists for V, it is deleted at step 824.

If, at step 820 it is determined that V is not inside a bounding volume of Inclusive type for E, a determination is made at step 826 as to whether an "Included List" exists for V. If such as list does exist, further consideration need not be given to E and processing proceeds to step 832. If, at step 826, such a list does not exist, then an entry is made, at step 828, in the "Not Included List" for V, the entry including the distance between E and V. If, at step 828, a "Not Included List" does not exist for V, one is created at this point and the appropriate entry made in it.

The "Not Included List" only includes entries for the 'n' closest E's to which V can be assigned, where 'n' is the preselected maximum number of elements to which a vertex can be assigned. When the "Not Included List" has 'n' entries, additional entries are only added if their distance between E and V is less than the distance for an entry already in the list. In such a case, the new entry with the lessor distance replaces the previous entry with the greatest distance. If the distance of the new entry is greater than all of the distances in the list, the new entry is discarded.

Processing then proceeds to step 832 wherein a determination is made as to whether all E's have been considered for V. If one or more E's remain to be considered, the next E is selected at step 836 and processing reverts to step 804. If all E's have been considered, processing proceeds to step 838.

At step 838 the list, either the "Included List" or the "Not Included List", is processed to assign V to each E on the list with an appropriate weighting, specifically with a weighting which is inversely proportional to the distance between the vertex V and the respective skeleton element E.

Figure 19A:
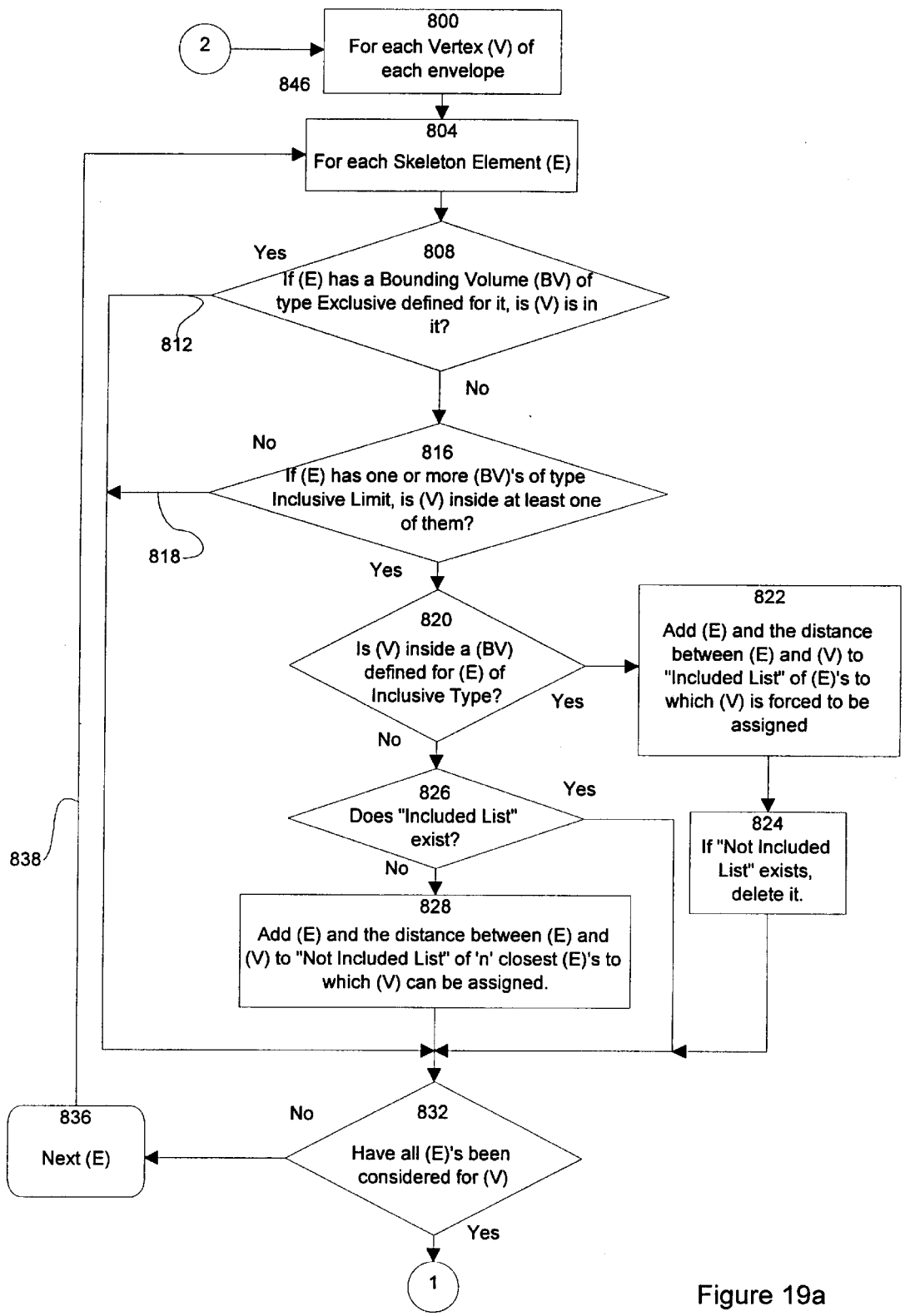
FIGS. 19a and 19b show a flowchart representing an automated assignment process employing bounding volumes, in accordance with an embodiment of the present invention.
Figure 19B:
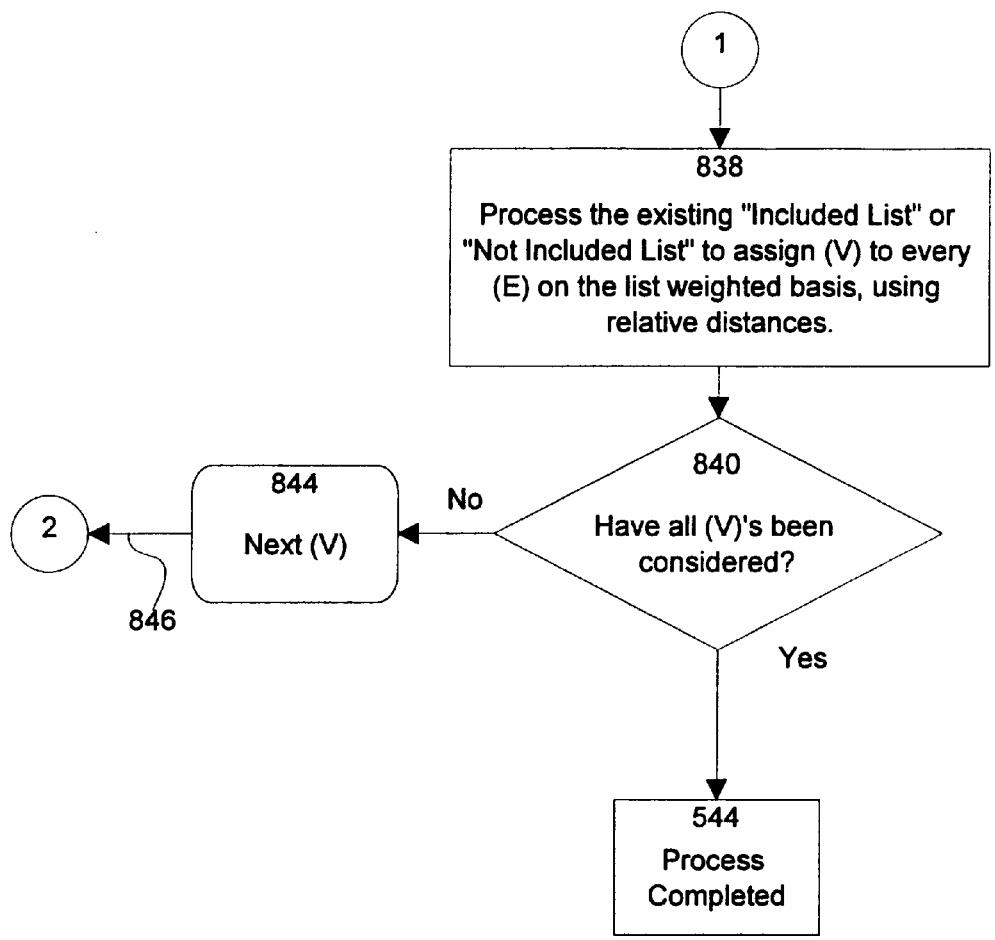

Processing then proceeds to step 840, shown in FIG. 19a, wherein a determination is made as to whether all V's have been considered. If one or more V's remain to be considered, the next V is selected at step 844 and processing returns to step 800, as indicated by arrow 846.

If all V's have been processed, then processing concludes at step 544.

It will be apparent to those of skill in the art that while the present invention is a significant improvement over prior art automatic assignment methods, it is contemplated that some manual assignment may still be required on the part of the animation artist from time to time. However, it is expected that this manual assignment will be primarily be required for only very fine detail or unusual skeleton geometries.

In addition to the advantages described above for improved automated assignment of envelope vertices to skeleton elements, another of the other perceived advantages of the present invention is that the bounding volumes are skeleton-dependent, rather than envelope-dependent. Specifically, as described above, bounding volumes are defined for skeleton elements and thus are independent of the actual envelope or envelopes defined for the skeleton. This allows an animation artist to employ a simple low-resolution (i.e.—relatively few vertices) development envelope or envelopes while developing an animation to obtain correct positioning, movements, storyboarding, etc. The animation artist can assign vertices of these development envelopes employing the bounding volumes and assignment operation types of the present invention and, when the animation artist wishes to render the animation with greater detail, the simple development envelope or envelopes may be discarded and replaced with production high-resolution envelopes whose more numerous vertices will be assigned to the skeletons via the same bounding volumes defined for the development envelope. This can be particularly advantageous when animation development is iterative in that the production envelopes and development envelopes can be interchanged as desired, allowing the animation artist to perform production rendering, storyboarding, etc. as desired without requiring tedious reassignment of envelopes.

The present invention provides a unique and convenient manner for an animation to control the automated assignment of vertices to skeleton elements in animation models. In particular, the present invention provides a method and system which allows the animation artist to control the automated assignment of envelope vertices in a manner which is believed to be versatile, easy and relatively intuitive. With practice, it is believed that in many circumstances an animation artist will need to perform little, if any, manual adjustment of vertex assignments. Further, as the method and system of the present invention involve bounding volumes defined for skeleton elements, and thus independent of the envelope, the animation artist may change envelopes at will, without requiring time consuming and labourious re-assignment of the envelopes' vertices.

The above-described embodiments of the invention are intended to be examples of the present invention and alterations and modifications may be effected thereto, by those of skill in the art, without departing from the scope of the invention which is defined solely by the claims appended hereto.

We claim:

1. A method of relating at least one envelope whose geometry is defined by a plurality of vertices, to one or more skeleton elements in a model used for animation, comprising the steps of:

(i) selecting a skeleton for an animation model, said skeleton comprising at least one skeleton element;

(ii) selecting a skeleton element from said skeleton;

(iii) defining at least one bounding volume for said selected skeleton element, said bounding volume defining a desired effective volume;

(iv) positioning said bounding volume relative to said selected skeleton element;

(v) selecting an assignment operation type for said bounding volume to define the operation of said assignment for envelope vertices located within said effective volume of said bounding volume;

(vi) repeating steps (iii) through (v) as desired;

(vii) repeating steps (ii) through (vi) as desired;

(viii) selecting a number "n" representing a maximum number of skeleton elements to which each vertex can be assigned; and (ix) after said at least one envelope has been positioned relative to said skeleton, assigning each vertex of said at least one envelope to no more than said "n" skeleton elements of said at least one skeleton elements which are located closest to said vertex, said assignments to each of said "n" skeleton elements being weighted in inverse proportion to a distance determined between each said skeleton element to said vertex and in accordance with said defined bounding volumes and said selected assignment operation types.

2. The method of claim 1 wherein in step (v) said assignment operation types includes an Exclusive type wherein a vertex within said effective volume of a bounding volume of Exclusive type defined for a skeleton element is not assigned to said skeleton element in step (ix).

3. The method of claim 2 wherein in step (v) said assignment operation types further includes an assignment type for said bounding volume to define the operation of said assignment for envelope vertices located outside said effective volume of said bounding volume.

4. The method of claim 3 wherein said further included assignment operation type is an Inclusive Limit type wherein a vertex outside a bounding volume of Inclusive Limit type defined for a skeleton element will not be assigned to said skeleton element in step (ix).

5. The method of claim 3 wherein at least two bounding volumes are defined and the effective volumes of said at least two bounding volumes can overlap, the assignment of step (ix) considering each bounding volume when performing said assignment of a vertex.

6. The method of claim 2 wherein at least two bounding volumes are defined and the effective volumes of said at least two bounding volumes can overlap, the assignment of step (ix) considering each bounding volume within which a vertex is located when performing said assignment.

7. The method of claim 1 wherein in step (v) said assignment operation types includes an Inclusive type wherein a vertex within said effective volume of at least one bounding volume of Inclusive type, each of said at least one bounding volume of Inclusive type being defined for a different skeleton element, will only be assigned in step (ix) to said different skeleton elements.

8. The method of claim 7 wherein in step (v) said assignment operation types further includes an assignment type for said bounding volume to define the operation of said assignment for envelope vertices located outside said effective volume of said bounding volume.

9. The method of claim 8 wherein said further included assignment operation type is an Inclusive Limit type wherein a vertex outside a bounding volume of Inclusive Limit type defined for a skeleton element will not be assigned to said skeleton element in step (ix).

10. The method of claim 7 wherein at least two bounding volumes are defined and the effective volumes of said at least two bounding volumes can overlap, the assignment of step (ix) considering each bounding volume within which a vertex is located when performing said assignment.

11. The method of claim 1 wherein in step (v) said assignment operation types include an Exclusive type wherein a vertex within said effective volume of a bounding volume of Exclusive type defined for a skeleton element is not assigned to said skeleton element in step (ix) and an Inclusive type wherein a vertex within said effective volume of at least one bounding volume of Inclusive type, each of said at least one bounding volume of Inclusive type being defined for a different skeleton element, will only be assigned in step (ix) to said different skeleton elements.

12. The method of claim 11 wherein in step (v) said assignment operation types further includes an assignment type for said bounding volume to define the operation of said assignment for envelope vertices located outside said effective volume of said bounding volume.

13. The method of claim 12 wherein said further included assignment operation type is an Inclusive Limit type wherein a vertex outside a bounding volume of Inclusive Limit type defined for a skeleton element will not be assigned to said skeleton element in step (ix).

14. The method of claim 13 wherein at least two bounding volumes are defined and the effective volumes of said at least two bounding volumes can overlap, the assignment of step (ix) considering each bounding volume when performing said assignment of a vertex.

15. The method of claim 13 wherein step (ix) can be performed as desired when said at least one envelope is removed from said model and at least one second envelope is substituted therefore.

16. The method of claim 15 wherein said at least one envelope includes a different number of vertices than said at least one second envelope.

17. The method of claim 1 wherein at least two bounding volumes are defined and the effective volumes of said at least two bounding volumes can overlap, the assignment of step (ix) considering each bounding volume within which a vertex is located when performing said assignment.

18. The method of claim 1 wherein step (ix) can be performed as desired when said at least one envelope is removed from said model and at least one second envelope is substituted therefore.

19. The method of claim 18 wherein said at least one envelope includes a different number of vertices than said at least one second envelope.

20. The method of claim 1 wherein for skeletons of articulated chains, the determined distance in step (ix) is the perpendicular distance between the vertex and a straight datum extending from the skeleton element to the next skeleton element in said articulated chain.

21. A system for defining an animation model comprising a skeleton for said model to which at least one envelope including a plurality of vertices is to be associated, such that said at least one envelope moves with said skeleton in said animation, comprising:

skeleton definition means to define at least one skeleton member and at least one skeleton element associated therewith;

bounding volume definition means to define a bounding volume for said at least one skeleton element, said bounding volume defining a volume positioned relative to said at least one skeleton element and having an assignment type defined therefore;

assignment means operable to assign vertices of said at least one envelope to said at least one skeleton element of said skeleton, said assignment means operable to assign said vertices to a preselected maximum number of skeleton elements, said assignments for each said vertex being weighted inversely proportional to the relative determined distance between said vertex and each of said maximum number of skeleton elements, said assignment means being responsive to all bounding volumes defined for said at least one skeleton element such that each vertex located within at least one said volume of said bounding volumes is assigned according to said selected assignment type for each said bounding volume.

22. The system of claim 21 wherein said selected assignment types available for said bounding volumes includes an Exclusive type wherein a vertex of said at least one envelope which is within a bounding volume of Exclusive type defined for said at least one skeleton element is not assigned to said at least one skeleton element by said assignment means.

23. The system of claim 21 wherein said selected assignment types available for said bounding volumes includes an Inclusive type wherein a vertex of said at least one envelope within at least one bounding volume of Inclusive type, each of said at least one bounding volumes of Inclusive type being defined for a different skeleton element, are only assigned to said different skeleton elements by said assignment means.

24. The system of claim 21 wherein said selected assignment types available for said bounding volumes include an Exclusive type, wherein a vertex of said at least one an envelope which is within a bounding volume of Exclusive type defined for said at least one skeleton element is not assigned to said at least one skeleton element by said assignment means, and an Inclusive type wherein a vertex of an envelope within at least one bounding volume of Inclusive type, each of said at least one bounding volumes of Inclusive type being defined for a different skeleton element, are only assigned to said different skeleton elements by said assignment means.

25. The system of claim 24 wherein said selected assignment types available for said bounding volumes further includes an Inclusive Limit type wherein a vertex of said at least one envelope which is outside a bounding volume of Inclusive Limit type defined for said at least one skeleton element is not assigned to said at least one skeleton element by said assignment means.

26. The system of claim 21 wherein said skeleton definition means and said bounding volume definition means include a graphical user interface implemented on a general purpose computer system.

27. The system of claim 21 wherein said determined distance employed by said assignment means for skeletons of articulated chains is the perpendicular distance between the vertex and a straight datum extending from the skeleton element to the next skeleton element in said articulated chain.

28. A method of assigning the vertices which define an envelope of an animation model to a skeleton in said animation model, comprising the steps of:

(i) defining a skeleton comprising at least one skeleton element;

(ii) defining at least one bounding volume for at least said at least one skeleton element, each said bounding volume defining an effective volume which is positioned relative to said at least one skeleton element;

(iii) selecting an assignment operation type for each said at least one bounding volume, said assignment operation type modifying the method employed to assign vertices located within the effective volume of each said at least one bounding volume;

(iv) selecting a maximum number of skeleton elements to which a vertex can be assigned;

(v) positioning at least one envelope relative to said skeleton for assignment thereto;

(vi) assigning the vertices of said at least one envelop which are not within a bounding volume to said selected maximum number of skeleton elements, said assignments being weighted inversely proportional to the determined distance between each vertex and each of said maximum number of skeleton elements;

(vii) assigning the vertices of said at least one envelope which are within a bounding volume according to the assignment operation type defined for said bounding volume.

29. The method of claim 28 wherein said assignment operation types include an Exclusive type wherein a vertex within a bounding volume of Exclusive type defined for a skeleton element is not assigned to said skeleton element.

30. The method of claim 29 wherein said assignment operation types further include an Inclusive type wherein a vertex within at least one bounding volume of Inclusive type, each of said at least one bounding volume of Inclusive type being defined for a different skeleton element, will only be assigned to said different skeleton elements.

31. The method of claim 30 wherein said assignment operation types further include an Inclusive Limit type wherein in step (vi) each vertex which is outside of a bounding volume of Inclusive Limit type will not be assigned to the skeleton element for which said bounding volume is defined.

32. The method of claim 28 wherein said assignment operation types include an Inclusive type wherein a vertex within at least one bounding volume of Inclusive type, each of said at least one bounding volume of Inclusive type being defined for a different skeleton element, will only be assigned to said different skeleton elements.

* * * * *